US010511954B2

(12) United States Patent
Sen et al.

(10) Patent No.: US 10,511,954 B2
(45) Date of Patent: Dec. 17, 2019

(54) METHOD AND SYSTEM FOR WLAN D2D TECHNOLOGY AND LTE PROSE INTERWORKING, PROSE OPTIMIZATION

(71) Applicant: Samsung Electronics Co., Ltd, Suwon-si (KR)

(72) Inventors: Arijit Sen, Bangalore (IN); Jagadeesh Gandikota, Bangalore (IN); Kyoo-Chun Cho, Suwon-si (KR); Kranthi Kumar Thuthika, Bangalore (IN); Pratibha Kattemane Satyaganapati, Bangalore (IN); Yong-Soo Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/910,984

(22) Filed: Mar. 2, 2018

(65) Prior Publication Data

US 2018/0279110 A1 Sep. 27, 2018

(30) Foreign Application Priority Data

Mar. 2, 2017 (IN) .............................. 201741007443
Mar. 1, 2018 (IN) .............................. 201741007443

(51) Int. Cl.
*H04W 8/00* (2009.01)
*H04W 76/14* (2018.01)
(Continued)

(52) U.S. Cl.
CPC ........... *H04W 8/005* (2013.01); *H04W 76/14* (2018.02); *H04W 84/12* (2013.01); *H04W 88/04* (2013.01);
(Continued)

(58) Field of Classification Search
CPC ..... H04W 84/12; H04W 8/005; H04W 88/04; H04W 76/30; H04W 76/14; H04W 8/00;
(Continued)

(56) References Cited

U.S. PATENT DOCUMENTS 8,917,708 B2   12/2014  Venkatachalam et al.
9,603,176 B2    3/2017  Wei
(Continued)

FOREIGN PATENT DOCUMENTS

EP        2978278 A1     1/2016
WO    2016/186438 A1    11/2016

OTHER PUBLICATIONS

International Search Report dated Jun. 11, 2018 in connection with International Patent Application No. PCT/KR2018/002553.
(Continued)

*Primary Examiner* — Rownak Islam

(57) ABSTRACT

The various embodiments of the present invention disclose a method of transmitting a Wireless Local Area Network (WLAN) discovery frame over a PC5 link. According to one embodiment, the method includes registering, by one or more User Equipment's (UE), with a Prose Server by sending a capability information for receiving direct discovery or communication parameters, policies, authorization, provisioning and radio resources by the prose server, the one or more UE's to include a WLAN discovery frame in a PC5 message, transmitting, by a first User Equipment, a PC5 discovery message to a second User Equipment, indicating by the second UE, a message to a neighbor awareness networking (NAN) discovery engine indicating the reception of PC5 Discovery message along with the WLAN discovery frame, and establishing by the second UE, a WLAN communication link with the first UE, without performing a WLAN discovery search.

16 Claims, 27 Drawing Sheets

(51) Int. Cl.
*H04W 84/12* (2009.01)
*H04W 88/04* (2009.01)

(52) U.S. Cl.
CPC .............. *Y02D 70/00* (2018.01); *Y02D 70/10*
(2018.01); *Y02D 70/12* (2018.01); *Y02D*
*70/126* (2018.01); *Y02D 70/1262* (2018.01);
*Y02D 70/14* (2018.01); *Y02D 70/142*
(2018.01); *Y02D 70/164* (2018.01); *Y02D*
*70/20* (2018.01); *Y02D 70/21* (2018.01); *Y02D*
*70/22* (2018.01)

(58) Field of Classification Search
CPC ...... Y02D 70/142; Y02D 70/00; Y02D 70/22;
Y02D 70/14; Y02D 70/164; Y02D 70/10;
Y02D 70/12; Y02D 70/126; Y02D 70/20;
Y02D 70/21
USPC .......................................................... 370/338
See application file for complete search history.

(56) References Cited

U.S. PATENT DOCUMENTS

| | | | | |
|---|---|---|---|---|
| 2015/0289127 | A1* | 10/2015 | Ou ........................ | H04W 8/005 |
| | | | | 455/426.1 |
| 2016/0100305 | A1 | 4/2016 | Karampatsis et al. | |
| 2016/0295347 | A1 | 10/2016 | Ahmad et al. | |
| 2017/0337394 | A1* | 11/2017 | Wang ....................... | H04L 67/16 |
| 2018/0063691 | A1* | 3/2018 | Shuman .................. | H04W 4/80 |
| 2018/0103417 | A1 | 4/2018 | Choi et al. | |
| 2018/0288611 | A1* | 10/2018 | Amin .................... | H04W 12/10 |
| 2018/0295655 | A1* | 10/2018 | Cavalcanti .............. | H04W 4/46 |

OTHER PUBLICATIONS

Written Opinion of the International Searching Authority dated Jun. 11, 2018 in connection with International Patent Application No. PCT/KR2018/002553.
Intel, "Inclusion of WLAN direct discovery technologies as an alternative for ProSe Direct Discovery: WLAN technology agnostic part", Change Request, SA WG2 Meeting #118-BIS, Jan. 16-20, 2017, 33 pages, S2-170323.
Intel et al., "Justification for New WID on Inclusion of WLAN direct discovery technologies as an alternative for ProSe Direct Discovery; Stage 2", SA WG2 Meeting #11bis, Jan. 16-20, 3 pages, S2-170319.
"3rd Generation Partnership Project; Technical Specification Group Services and System Aspects; Proximity-based services (ProSe); Stage 2 (Release 13)", 3GPP TS 23.303 V13.0.0, Jun. 22, 2015, 99 pages.
Intel, "Inclusion of WLAN direct discovery technologies as an alternative for ProSe Direct Discovery: NAN specific part", SA WG2 Meeting #118-BIS, Jan. 16-20, 2017, S2-170326, 4 pages.
Intel, "EPC-level discovery and EPC support for WLAN direct communication", 3GPP SA2 Meeting S2#98, Jul. 15-19, 2013, S2-132721, 12 pages.
Intel Corporation, "Discussion on inclusion of WLAN direct discovery technologies as an alternative for ProSe direct discovery", 3GPP TSG-SA WG1 #76, Nov. 7-11, 2016, S1-163076, 3 pages.
Intel et al., "Prioritising EPC support of ProSe communication over WLAN", 3GPP TSG SA Meeting #61, Sep. -11, 2013, TD SP-130466, 4 pages.
Intel, "Inclusion of WLAN direct discovery technologies as an alternative for ProSe direct discovery", 3GPP TSG-SA WG1 Meeting #77, Nov. 7-11, 2016, S1-163202, 6 pages.
Supplementary European Search Report dated Nov. 4, 2019 in connection with European Patent Application No. 18 76 0925, 14 pages.

* cited by examiner

METHOD AND SYSTEM FOR WLAN D2D TECHNOLOGY AND LTE PROSE INTERWORKING, PROSE OPTIMIZATION

CROSS-REFERENCE TO RELATED APPLICATIONS AND CLAIM OF PRIORITY

This application is based on and claims priority under 35 U.S.C. § 119 to India Patent Application No. 201741007443 filed on Mar. 2, 2017 and India Patent Application No. 201741007443 filed on Mar. 1, 2018 in the India Intellectual Property Office, the disclosures of which are incorporated herein by reference in their entireties.

TECHNICAL FIELD

The present invention generally relates to wireless communication systems, and more particularly the recent invention relates to a method and system for 3GPP Prose.

BACKGROUND

From Release 12 onwards, 3GPP standards has come up with Proximity based Services (ProSe) that enables user equipment's (UEs) to discover and/or to communicate with other UEs directly, without the signal or data packets being routed via network entities. ProSe scenarios are defined for in-coverage, out-of-coverage and partial coverage situations. Communication in partial coverage situation is possible by use of RELAY (ProSe-UE-to-N/W-Relay) services.

For enabling ProSe, new channels and procedures have been defined and system information blocks (SIBS) also have been modified/introduced. Discovery and Communication happens through Side Link (SL) channels. Network has the authorization control (SERVICE AUTHORIZATION) which enables or disables the UEs to discover or communicate or both, to be RELAY, and the like. Prose Direct Discovery is a procedure employed by a ProSe-enabled UE to discover other ProSe-enabled UEs in its vicinity by using LTE direct radio access technology, where UEs need to announce and Monitor certain service related information to discover each other with or without LTE coverage. These procedures are power consuming, which needs to be addressed.

3GPP standards group is currently working on a New WID on Inclusion of WLAN direct discovery technologies as an alternative for Prose direct discovery (from S1-163221). Currently there are various gaps found in WLAN and Prose interworking that need to be addressed for better quality of service to users. The issues are discussed as herein below:

Issue of inclusion of WLAN discovery frame such as, but not limited to, NAN Service Discovery Frame, Wi-Fi P2P Service Discovery Query frame, and the like in PC5 discovery message:

Consider a scenario as described in FIG. 1, wherein FIG. 1 is a schematic diagram 100 illustrating an issue of not sending a WLAN discovery frames in a PC5 discovery message, according to an existing art. FIG. 1 illustrates communication between a user equipment1 (UE1) 102 and a user equipment2 (UE2) 104, wherein there is no provision of sending the WLAN discovery frame over a PC5 link (e.g. LTE prose radio access technology). According to the existing methods, if the UE1 102 discovers the UE2 104 over the PC5 link without EPC support and if both the devices want to communicate over a WLAN radio access technology (using Wi-Fi P2P), then they can't start WLAN communication without performing WLAN discovery. During such instance, the UE1 102 or UE2 104 may have to trigger WLAN direct discovery and then start WLAN communication. Further, if the network is unable to provide service due to congestion and thus wants to re-direct UEs to use WLAN technology for direct discovery or communication, then it is not possible to do directly without performing discovery.

Issue of UE moving out of communication range or signal quality degradation:

Consider a scenario as described in FIG. 3, wherein FIG. 3 is schematic diagram 300 illustrating issue of disconnection of a session on UE moving out of communication range or signal quality degradation, according to an existing art. FIG. 3 illustrates communication between a user equipment1 (UE1) 302 and a user equipment2 (UE2) 304, wherein the two UEs having an ongoing communication session over LTE Prose or WLAN direct access technology, and one of the UEs (e.g. UE2) moves out of the communication range where the radio signal either goes bad either in LTE ProSe or WLAN radio access technology, then the session gets disconnected. As per a prior art, once the connection fails there are no procedure defined to fallback to other D2D (device to device) technology. In other words, there is no fallback mechanism to other 3GPP/non-3GPP access technology defined. The session established by the user will be dropped causing inconvenience to the user.

Issue of UE assisting prose discovery radio access selection (WLAN or LTE Prose):

Consider a scenario as described in FIG. 6, wherein FIG. 6 is a schematic diagram 600 illustrating an issue of UE assisting prose discovery radio access selection, according to an existing art. FIG. 6 illustrates communication between a user equipment1 (UE1) 602 and a user equipment2 (UE2) 604, wherein a prose server 606 can instruct both UE1 602 and UE2 604 to do WLAN direct discovery or communication. For example, when the UE 2 is out of WLAN range, the discovery or communication fails. According to the existing arts, there are no mechanisms defined for the prose server 606 to validate the location of the UEs and accordingly instruct the UEs to start PC5 discovery or communication.

FIG. 8 is schematic diagram 800 illustrating an issue of UE assisted WLAN discovery radio access selection based on UEs' signal condition or performance status, according to another existing art. According to FIG. 8, a Prose server 806 can indicate radio access technology for discovery or communication. There are various scenarios that can occur in existing methods, such as, but not limited to, the WLAN signal strength is below threshold, a UE1 802 or a UE2 804 battery level is low and the UEs may want to use either of the radios (LTE Prose or WLAN), if the UE1 802 or UE2 804 identifies that LTE Prose is providing good signal strength or less network load and want to switch over to the LTE ProSe, or based on geographic location and the like. Then, according to the existing art, there are no methods that UEs can request the Prose server 806 to switch to other access technology or no method/criterion is defined for UE to autonomously switch to other access technology.

Issue of gaps in handling of PC5 Discovery message received over WLAN discovery or communication:

Consider a scenario as described in FIG. 10, wherein FIG. 10 is a schematic diagram 1000 illustrating issue of gaps in handling of PC5 Discovery message received over WLAN discovery or communication, according to an existing art. FIG. 10 illustrates communication between a user equipment1 (UE1) 1002 and a user equipment2 (UE2) 1004, wherein the UE1 1002 may need to perform prose direct discovery procedure for public safety operations and may need to send discovery messages to UE2 1004 or initiate a communication related signaling messages. The UE2 1004, on receiving the WLAN discovery message from the UE1 1002 is not aware of the UE1's 1002 preference for the further discovery/communication operations. The UE2 1004, on receiving the WLAN discovery message from UE1 1002 is not aware whether the UE1 1002 is authorized to use PC5 or not to select PC5 radio access technology for further operations. Also, the Prose server 1006 cannot indicate how UE should initiate further discovery operations on receiving a discovery message over WLAN.

Issue of interworking between devices that support either of the direct discovery or direct communication technologies such as WLAN mode only or Prose mode only supported devices using RELAY UE:

Consider a scenario as described in FIG. 13, wherein FIG. 13 is a schematic diagram 1300 illustrating issue of interworking between WLAN mode and Prose mode only supported devices, according to an existing art. FIG. 13 illustrates communication between a user equipment1 (UE1) 1302 and a user equipment2 (UE2) 1304, wherein the UE1 1302 operating in WLAN mode only and do not supports LTE prose mode. The UE2 is operating in LTE prose mode only do not supports WLAN mode. The UE1 1302 is not be able to do the direct discovery or communication with the UE2 1304. There are no such mechanisms defined for such UEs to interwork. For instance, the UE1 1302 operating in WLAN mode only wants to do restricted discovery to the UE2 1304 which is supporting only LTE Prose, then according to the existing arts, it is not possible.

Issue of Announcement of ETWS or CMAS messages over PC5 or WLAN discovery:

3GPP has standardized a warning message system namely ETWS (Earthquake and Tsunami Warning Service)/CMAS to immediately notify the emergency information to users. As per existing methods, UE's that are not present in the coverage area/region of network will not be able to receive the ETWS or CMAS information.

Issue of power consumption and resource utilization:

ProSe Direct Discovery is a procedure employed by a ProSe-enabled UE to discover other ProSe-enabled UEs in its vicinity by using LTE/WLAN direct radio access technology, Where UE's need to Announce and Monitor certain service related information to discover each other with/without LTE radio access presence. In Prose direct discovery procedure announcing UE will consume more power than a monitoring UE and the power consumption is not centralized between announcing and monitoring UE's.

Prose enabled UE which needs to participate in one to one prose direct communication/which needs to communicate with a relay UE, shall transmit the announce request message periodically until the peer prose UE/Relay UE responds to the announce request. A prose UE which keeps announcing periodically for finding peer UE or relay UE consumes a lot amount of battery power on the UE.

Consider a scenario as described in FIG. 24, wherein FIG. 24 is a schematic diagram 2400 illustrating issue of announcing UE, according to an existing art. A UE1 2402 which is the prose enabled UE and an announce mode, transmits the PC5 announce request message to a UE2 which is a monitor mode) (2404) and a UE 3 which is a monitor mode) 2406 which are the relay UEs or the peer UEs. The UE2 2404 and the UE3 2406 transmit a direct communication request message to the UE1 2402 and no more monitor announcing about the participating in one to one prose direct communication. However, the UE1 2402 still continues to announce the participating in one to one prose direct communication. Therefore, the UE1 2402 transmits the PC5 announce request message to the UE2 2404 and the UE3 2406 periodically.

Issue of Dynamically enable/disable UE to acting as a relay UE:

3GPP has come up with ProSe-UE-to-Network Relay from Rel-13 onwards which enables a remote UE (either out of E-UTRAN coverage or in E-UTRAN coverage) to use N/W services. In the latest releases, 3GPP is talking about UE-to-UE Relays too.

For a UE to be able to act as a ProSe-UE-to-Network Relay or a Remote UE, it should be PROVISIONED and AUTHORIZED by the N/W operator.

Major advantage of UE-to-Network relay is that it helps in extending network coverage. However, if a relay-capable UE is not performing relay (may be intentionally or because of authorization reject from the N/W), remote UEs can't use the N/W services if there's a sudden/temporary overload on the N/W at a certain area, if there is a sudden/temporary outage of N/W at a certain area and if there are temporary or permanent Coverage holes.

Consider a scenario as described in FIG. 26, wherein FIG. 26 is a schematic diagram 2600 illustrating issue of network loss or a coverage hole, according to an existing art. A UE1 (e.g. Relay UE 1) 2602 is not performing relay operation. A UE2 (e.g. Remote UE 2) 2604 and a UE3 (e.g. remote UE 3) 2606 are not able to receive services from the network because of coverage hole, temporary outage of the network or overloading on the network.

Therefore, there is a need of inclusion of the WLAN discovery frame (e.g., NAN service Discovery Frame, WLAN P2P Service discovery query frame etc.) related to WLAN NAN discovery information in a PC5 discovery message. Further, there is a need for session continuity between WLAN and Prose communication. Further, there is a need of UE assisted prose discovery radio access selection in WLAN or LTE ProSe. Further, there is need for a method for receiving the PC5 discovery message over WLAN. Further there is a need for a method of interworking between the devices operating in different radio access technologies. Further there is need for a method of network instructed prose discovery radio access selection for discovery messages received over the WLAN technology. Further there is a need for relaying the emergency warning information to devices not in network coverage. Further there is a need for an announce message from a relay UE will be received by other relay UE during a monitoring phase. Further there is a need for the announcements made by multiple Relay UEs. Further there is a need for enabling a UE to act as a relay UE.

The above-mentioned shortcomings, disadvantages and problems are addressed herein and which will be understood by reading and studying the following specification.

SUMMARY

The various embodiments of the present invention disclose a method of transmitting a Wireless Local Area Network (WLAN) discovery frame over a PC5 link. According to this embodiment, the method includes: registering, by one or more User Equipment's (UE), with a prose server by sending a capability information for receiving a PC5 discovery message to be used during in coverage and out of coverage conditions, provisioning, by the prose server, the one or more UE's to include the WLAN discovery frame in the PC5 discovery message, transmitting, by a first User Equipment, the PC5 discovery message to a second User Equipment, indicating, by the second UE, a message to a WLAN stack, wherein the message indicates reception of the PC5 discovery message along with the WLAN discovery frame, and establishing, by the second UE, a WLAN communication link with the first UE, without performing a WLAN discovery search.

According to one embodiment, the PC5 discovery message includes parameters of at least one of (a) a message type, (b) a ProSe application code, (c) an MIC and (d) an UTC based counter.

According to one embodiment, the UE capability information includes at least one of a WLAN peer-to-peer (P2P) support or a WLAN neighbor awareness networking (NAN) support and UEs preference for radio access technology to network during authorization.

According to one embodiment, a NAN service discovery information is included within the PC5 discovery message utilizing the parameters of at least one of the message type and the prose application code.

According to one embodiment, the message type parameter indicates that the PC5 discovery message comprises the WLAN discovery information. The UE forwards the message to a WLAN discovery engine of a corresponding UE, upon receiving the PC5 discovery message, for decoding the message to enable WLAN discovery and communication.

According to one embodiment, the prose application code includes a NAN service discovery frame information. The NAN service discovery frame information comprises at least one of a Hashed NAN service ID, a Hashed NAN interface address and a Service specific information.

According to one embodiment, the method further includes provisioning, by a network, the UE's to include the WLAN discovery frame in the PC5 discovery message. The WLAN discovery frame is utilized during at least one of in coverage or out of coverage scenarios of at least one of the UE1 and the UE2.

In one aspect, a method of enabling session continuity between WLAN and Prose communication during out of coverage scenarios is described herein. According to one embodiment, the method includes authorizing, by a prose sever, an User Equipment (UE) to utilize at least one of a LTE Prose or a WLAN radio access technology for communication, initiating, by the UE, a communication with the prose server, measuring, by the UE, one or more preset conditions of communication links of the WLAN and the LTE prose radio access technology at periodic intervals to determine a signal condition, and performing by the UE, an automatic reselection from the WLAN direct to the LTE prose radio access technology based on the measurement of the one or more preset conditions, wherein the one or more preset conditions comprises at least one of the signal condition, a QoS requirement and a presence of number of announcing UEs in the WLAN or the LTE radio access technology in proximity area.

According to one embodiment, the UE maintains contexts of the WLAN and the LTE prose radio access technologies.

According to one embodiment, the method includes performing, by the UE, an automatic reselection from the LTE Prose to the WLAN radio access technology when the measured signal conditions are below a preset threshold signal condition.

According to one embodiment, the method further includes redirecting, by a network, the discovery or communication of the UE from a WLAN direct communication to a LTE Prose Direct communication or vice versa based on at least one of the signal condition, the QoS requirement and the presence of number of announcing other UEs sent from the UE to the prose server.

According to one embodiment, the method further includes provisioning, by a network, authorization of the UE to autonomously reselect from the WLAN to the LTE prose radio access technology or vice versa in at least one of universal integrated circuit card (UICC), mobile equipment (ME) and user equipment (UE) to be used during at least one of in coverage or out of coverage scenarios.

According to one embodiment, the UE informs a network on reselection from one radio access technology to another radio access technology by at least one of: sending a second message to the network for establishing communication or discovery over the WLAN radio access technology, wherein the second message comprises parameters of user id's and WLAN Link Layer ID's (WLL ID) of the UEs, and reusing an existing EPC support for establishing the communication or discovery over the WLAN radio access technology.

According to one embodiment, the method further includes performing, by the UE, a direct communication release from other UE over the LTE radio access technology when a direct communication with the other UE is established over the WLAN radio access technology, and establishing, by the UE, a communication or discovery with the other UE over the WLAN radio access technology and continues the communication after successful direct communication release over the LTE prose radio access technology.

In another aspect, a method of performing UE assisted prose discovery is described herein. According to one embodiment, the method includes instructing, by a prose server, a first User Equipment (UE1) and a second User equipment (UE2) to send periodic location information to the prose server by sending a location reporting indication to the UE1 and the UE2, transmitting, by the first UE and the second UE, a location report at periodic intervals to the prose server, instructing, by the prose server, the UE 1 to select a radio access technology when the UE1 unable to discover or establish communication with the UE2 for a predetermined time, and optimizing, by the UE1, a location update to the prose server on detecting the UE1 movement and based on a location information obtained from one or more sensors.

According to one embodiment, the method includes re-instructing, by the prose server, the UE1 and the UE2 to establish communication or discovery over LTE radio access technology on identifying that the UE1 and the UE2 are not in a WLAN communication range.

According to one embodiment, the method further includes identifying, by the UE1, at least one connection establishment condition while establishing the communication or discovery, wherein the at least one connection establishment condition comprises at least one of: identifying that a WLAN Signal strength is below a preset threshold, identifying whether a battery level of at least one of the UE1 and the UE2 is low and preference of at least one of (a) the UE1 or (b) the UE2 to utilize at least one of the LTE or a WLAN radio access technology for the discovery or communication, and identifying that the LTE radio access technology is providing at least one of a good signal strength or a less network load and preference of at least one of the UE1 or the UE2 to switch to the LTE radio access technology, transmitting, by the UE1, a request to the prose server, indicating the preference of the UE1 in selection of the radio access technology for discovery/communication, and receiving, by the UE1, a response from the prose server that instructs the UE1 to utilize the requested preferred radio access technology or reject the requested preferred radio access technology with a valid cause.

According to one embodiment, the prose server indicates the UE1 to switch from one radio access technology to other radio access technology without receiving request for the selection of the preferred radio access technology from the UE1.

According to one embodiment, the method further includes provisioning, by a network, an operator policy for network selection configured in at least one of the UE1, ME and UICC that are adapted to be utilized during out of coverage scenarios.

In another aspect, a method for enabling WLAN discovery including a PC5 discovery information. According to one embodiment, the method includes indicating, by a first User Equipment (UE1), preference for selection of a radio access technology in a PC5 discovery message sent over a WLAN radio access technology to a second User Equipment (UE2), indicating, by a prose server, to the UE2 the radio access technology to be selected for further operations on receiving the PC5 discovery message over the WLAN radio access technology, and selecting, by the UE2, the radio access technology to be utilized for the further operations on receiving the PC5 discovery message over the WLAN radio access technology based on scenarios of the UE1 and the UE2, wherein the scenarios comprise signal conditions, battery level in the UE1 and UE2 and congestion.

According to one embodiment, the method includes provisioning, by a network, an operator policy for network selection configured in at least one of the UE2, UICC and ME to be utilized during out of coverage scenarios.

According to one embodiment, the PC5 discovery message received by the UE2 indicates the prose server about the radio access technology over which the discovery information is received for at least one of authorization, charging, establishing at least one of a network assisted WLAN direct communication or a network assisted LTE direct communication and security.

According to one embodiment, the method further includes a LTE Prose enabled UE1 performing discovery operations over the WLAN radio access technology as indicated by the prose server receives information from at least one of the prose server or the network, wherein the information comprises the direct radio access technology to perform further operations.

According to one embodiment, the Prose enabled UE1 performing discovery operations over the WLAN radio access technology as indicated by the prose server autonomously selects the direct radio access technology to perform further operations.

In yet another aspect, a method for inclusion and interworking of WLAN and PC5 D2D is described herein. According to one embodiment, the method includes configuring, a relay device, to support simultaneously WLAN and LTE Prose radio access technologies; wherein the relay device is adapted for listening at least one of PC5 Announce/Monitor over LTE radio access technology and NAN Publish/Monitor or Wi-Fi P2P frame over WLAN radio access technology simultaneously, converting, by the relay device, a discovery frame received from a first radio access technology compatible to a discovery frame for a second radio access technology, setting up a communication data path between the first radio access technology and the second radio access technology, and enabling exchange of data packets between a UE1 and a UE2 once the data path is set up between the UE1 and the UE2.

According to one embodiment, the method further includes provisioning, by a network, an operator policy for network selection configured at least one of the UE1 or the UE2, ME and UICC to be utilized during out of coverage scenarios.

In yet another aspect, a method for enabling D2D communication over an unlicensed band is described herein. The method includes sending, by a first UE (UE1), a WLAN discovery frame in a D2D unlicensed discovery message, indicating, by a second UE (UE2), reception of the D2D unlicensed discovery message comprising the WLAN discovery frame to a WLAN stack, and establishing, by the WLAN stack, a direct WLAN communication link between the UE1 and the UE2 without WLAN discovery.

According to one embodiment, the method further includes automatically switching, by at least one of the UE1 or the UE2, communication from WLAN radio access technology to D2D LTE unlicensed radio access technology for enabling call or session continuity, when at least one of the UE1 or the UE2 moves out of WLAN communication range.

According to one embodiment, the method further includes configuring, by a relay device, to support simultaneously the WLAN and a D2D LTE radio access technology, wherein the relay device is adapted for listening at least one of D2D LTE unlicensed frames or NAN Publish/Monitor or Wi-Fi P2P frame over the WLAN radio access technology simultaneously, converting, by the relay device, a discovery frame received from a first radio access technology compatible to a discovery frame for a second radio access technology, setting up a communication data path between the first radio access technology and the second radio access technology, and enabling exchange of data packets between the UE1 and the UE2 once the data path is set up between the UE1 and the UE2.

According to one embodiment, at least one of the UE1 or the UE2 is adapted to include the WLAN discovery frame in the PC5 discovery message without the authentication of the prose server.

In yet another aspect, a method for optimizing emergency information broadcasting in a RELAY UE is described herein. According to one embodiment, the method includes broadcasting, by the relay UE, an earthquake and Tsunami warning system or commercial mobile alert system (ETWS/CMAS) information over at least one of a LTE or a WLAN radio access technology to remote UEs, introducing, by the relay UE, a new side link system information block (SL-SIBs) related to the ETWS/CMAS, and modifying existing Side Link Master Information Block (SL-MIB) to indicate decoding of the new SL-SIB's introduced.

According to one embodiment, the method further includes introducing Side Link Paging Channel (SL-PCH) from the relay UE to the remote UE for indicating paging information related to emergency warnings.

According to one embodiment, the method further includes one or more relay capable UEs, which are not under network coverage, on receiving the ETWS/CMAS information from the relay UE, broadcasts the received ETWS/CMAS information over at least one of the LTE or the WLAN radio access technology to other remote UEs which are not reachable by the Relay UE.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, obj ect code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
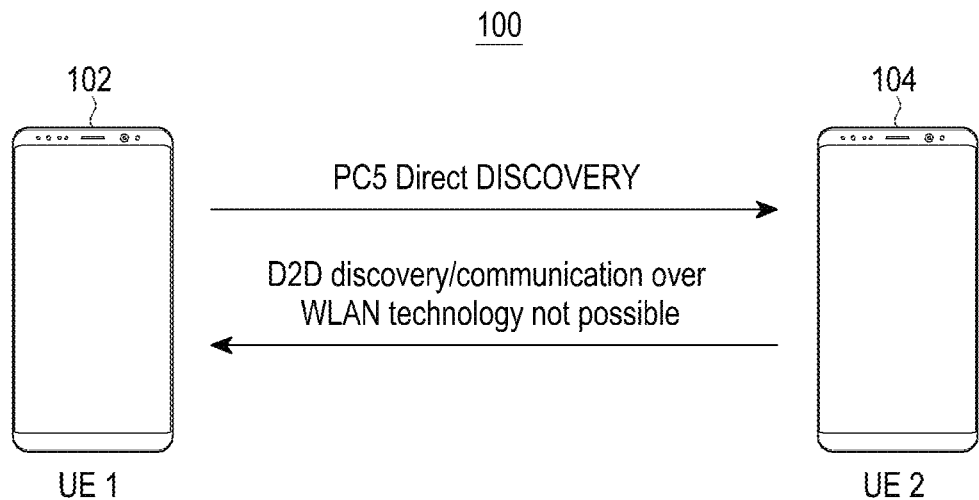
FIG. 1 is schematic diagram illustrating an issue of not sending WLAN discovery frames over a PC5 discovery message, according to an existing art.

Although specific features of the present invention are shown in some drawings and not in others, this is done for convenience only as each feature may be combined with any or all of the other features in accordance with the present invention.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present invention describes a method and system for WLAN D2D technology and LTE prose interworking, prose optimization. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The present invention describes a method and system for WLAN D2D technology and LTE prose interworking, prose optimization. Consider a scenario that UEs performing direct discovery or communication over LTE ProSe or WLAN radio access technology. However, in out of coverage or low-quality signal degradation scenarios, the UEs are unable to perform direct discovery or communication. Also, there may be a drawback of session or call discontinuity during the out of coverage or low-quality signal degradation scenarios. Therefore, including a WLAN discovery frame over a PC5 discovery message while establishing the communication or discovery between UEs minimizes the session or call discontinuity between the UEs is reduced and call continuity is established via the other radio access technology.

Figure 2:
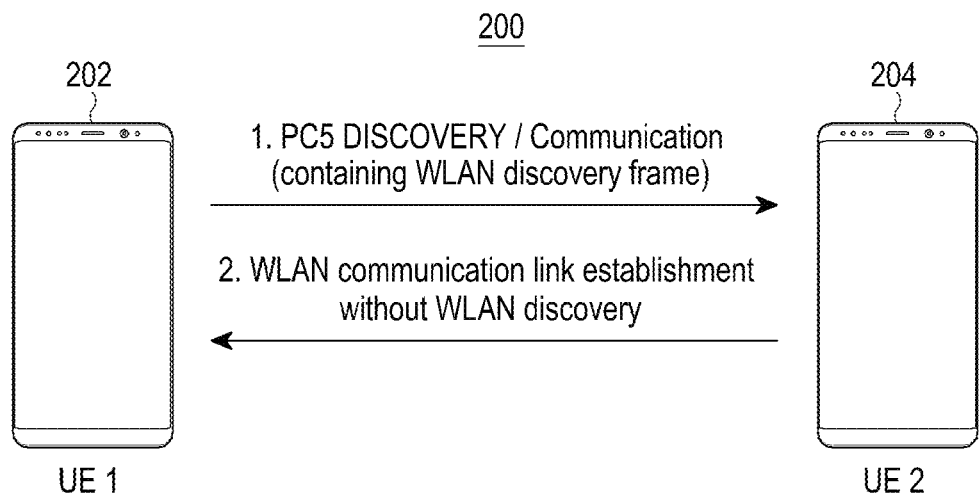
FIG. 2 is a schematic diagram illustrating a method for inclusion of a WLAN discovery frame in a PC5 discovery message, according to an embodiment of the present invention.
Figure 3:
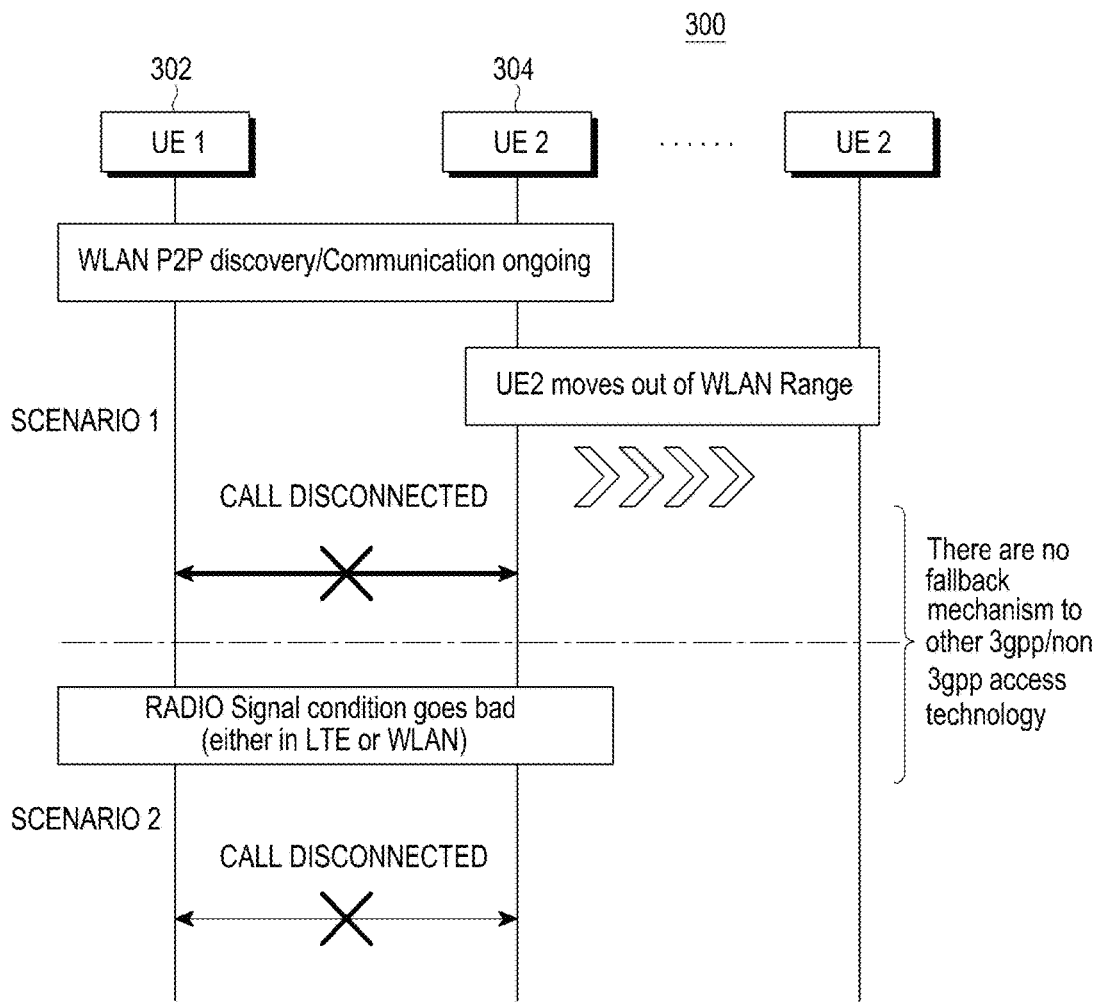
FIG. 3 is schematic diagram illustrating an issue of disconnection of a session on UE moving out of communication range or signal quality degradation, according to an existing art.

FIG. 2 is a schematic diagram 200 illustrating a method for inclusion of a WLAN discovery frame in a PC5 discovery message, according to an embodiment of the present invention. According to this embodiment, one or more user equipment's are registered initially with a prose server. The registration of the UEs (e.g. UE1 202 and UE2 204) is performed by sending a capability information and UEs preference for radio access technology to the prose server. The prose server is adapted for provisioning the one or more UEs to include the WLAN discovery frame in the PC5 discovery message. The WLAN discovery frame includes all relevant parameters (e.g. NAN service ID). In an embodiment, a network is adapted for provisioning the one or more UEs to include the WLAN discovery frame in the PC5 discovery message to be used during out of coverage scenarios of the UEs to establish the communication or discovery over WLAN radio access technology. At step 1, A first UE (UE1) 202 transmits the PC5 discovery message including the WLAN discovery frame to a second UE (UE2) 204 for which the discovery or communication is to be established. The second UE (UE2) 204 indicates to a neighbor awareness networking (NAN) discovery engine (e.g. WLAN stack) upon receiving the PC5 discovery message along with the WLAN discovery frame from the first UE. At step 2, the second UE 204 further establishes a communication with the first UE 202 over the wireless local area network (WLAN) radio access technology without performing a WLAN discovery.

In an embodiment, the PC5 discovery message includes parameters of (a) a message type, (b) a ProSe application code, (c) an MIC, and (d) an UTC based counter LSB. The UE capability information includes (a) WLAN peer to peer (P2P) and (b) WLAN NAN. The parameters (i) message type and (ii) ProSe application code are used for including the NAN discovery information into the PC5 discovery message by the UE1. The message type is defined from one of reserved message type fields to indicate that the PC5 discovery message includes the WLAN discovery information. The UE2 204 on receiving the PC5 discovery message, sent by the UE1 202, in which the message type is set as NAN discovery information forwards the PC5 discovery message to a WLAN discovery engine for decoding. The Prose Application Code includes the NAN service discovery frame information. The NAN service discovery frame information includes at least one of (a) a hashed NAN service ID, (b) a hashed NAN interface address and (c) a service specific information.

Figure 4:
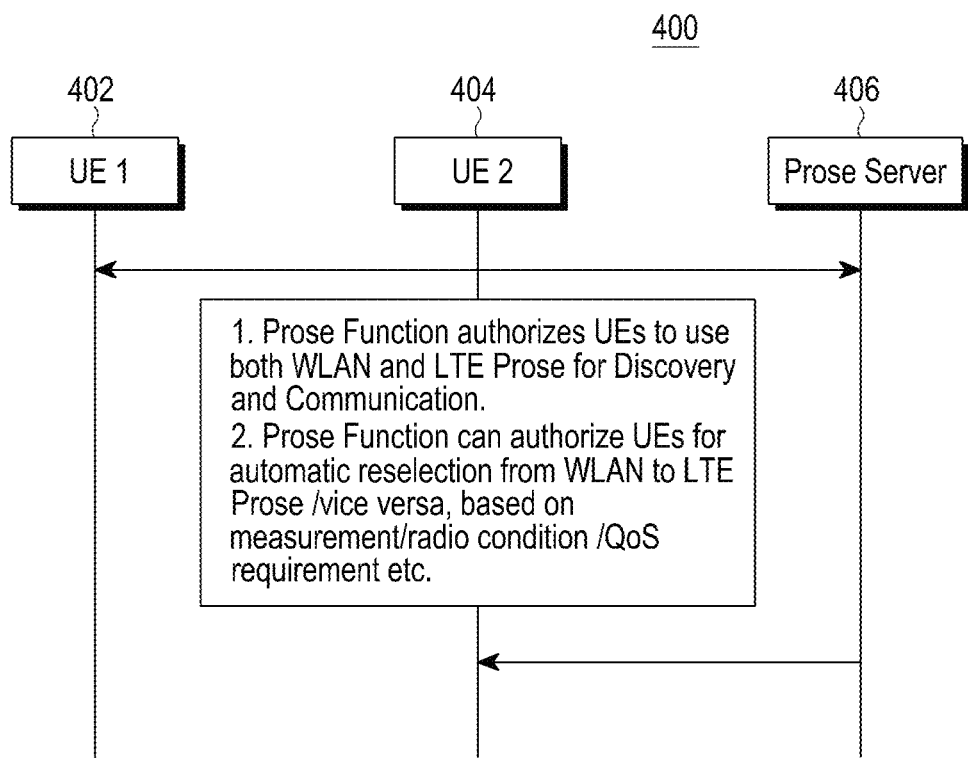
FIG. 4 is a schematic flow diagram illustrating UEs selection of WLAN and LTE Prose radio access technology for Discovery and communication upon authorization by the network, according to an embodiment of the present invention.

FIG. 4 is a schematic flow diagram 400 illustrating UEs selection of WLAN and LTE Prose radio access technology for discovery and communication upon authorization by network, according to an embodiment of the present invention. According to this embodiment, at step 1, a prose server 406 authorizes a first UE 402 (e.g. UE1) and a second UE 404 (e.g. UE2) upon successful registration with a prose server 406 to utilize at least one of WLAN and LTE prose radio access technology for discovery and communication, when at least one of the UE's enters a non-coverage area. In an embodiment, the UEs includes a WLAN discovery frame in a PC5 discovery message. In another embodiment, the UEs includes the PC5 discovery message in the WLAN discovery frame. The UEs (e.g. the UE1 or the UE2) initiates a communication with the prose server 406. The UEs further measures periodically signal conditions for (a) the WLAN and (b) the LTE prose radio access technology, when communication or discovery is initiated either over the WLAN or the LTE prose radio access technology. At step 2, the prose server 406 authorizes the UEs to automatically reselect from the WLAN to the LTE prose radio access technology or vice versa based on comparison of the measured signal condition and a threshold signal condition. The threshold signal condition is preset by the prose server 406. The threshold signal condition includes at least one of (i) a signal condition, (ii) a QoS requirement or (iii) presence of number of announcing UE's in the WLAN or LTE prose access technology in proximity area.

Figure 5:
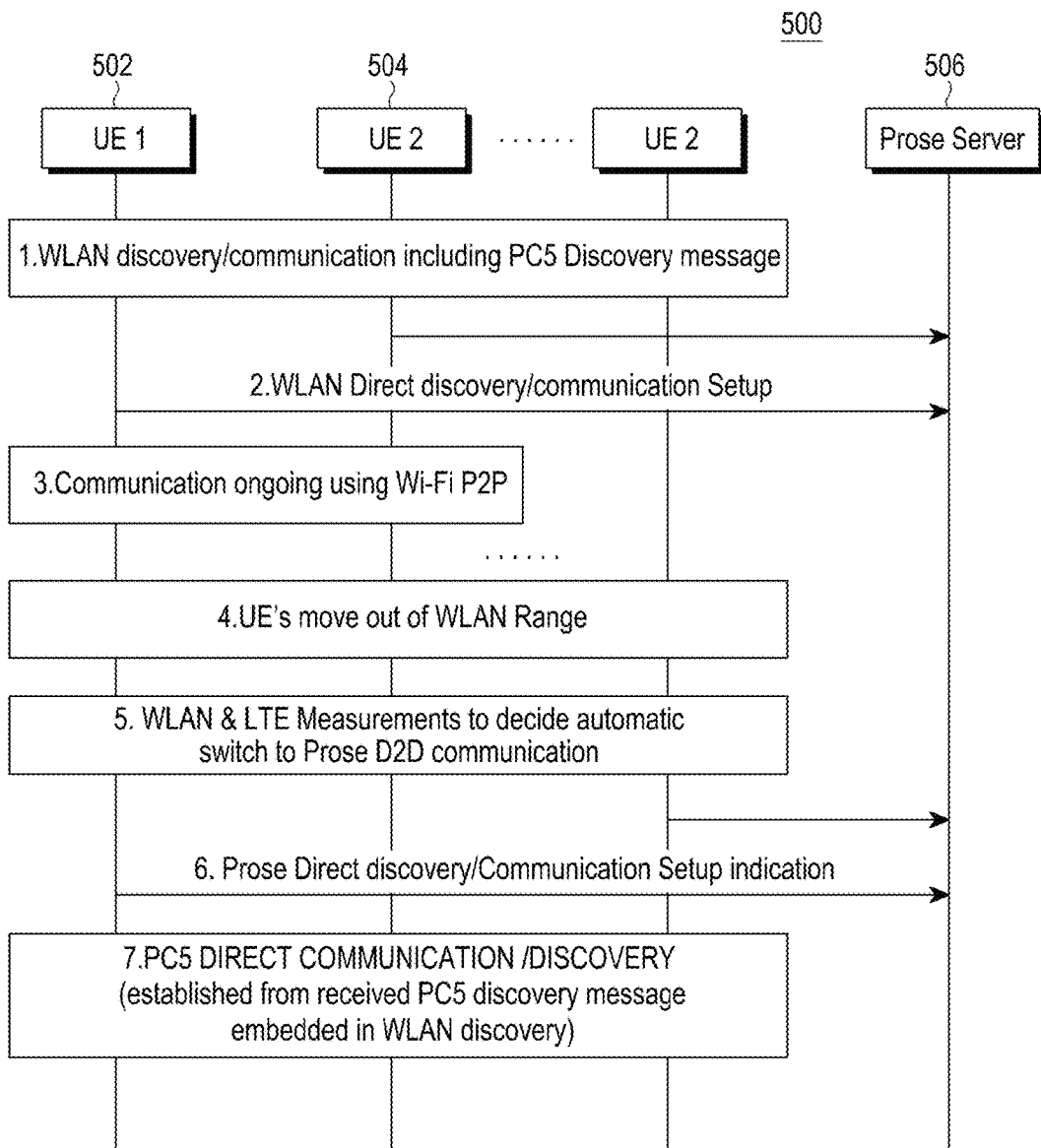
FIG. 5 is a schematic flow diagram illustrating a method for establishing call continuity, session continuity, handover, when UE move out of WLAN communication range, according to an embodiment of the present invention.
Figure 6:
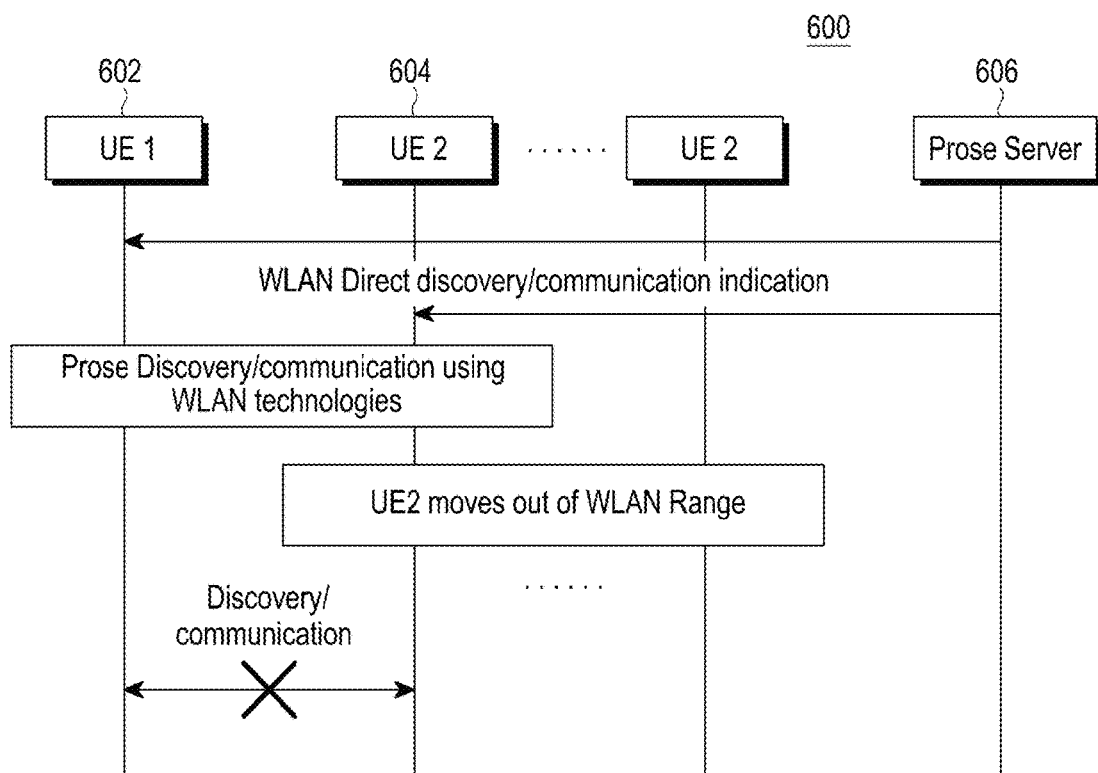
FIG. 6 is a schematic diagram illustrating an issue of UE assisting prose discovery radio access selection, according to an existing art.

FIG. 5 is a schematic flow diagram 500 illustrating a method for establishing call continuity, session continuity, handover, when UE move out of WLAN communication range, according to an embodiment of the present invention. FIG. 5 provides a solution for a scenario described in FIG. 3. According to this embodiment, at step 1, UE1 502 is discovering/communicating a UE2 504 over WLAN radio access technology that includes a PC5 discovery message. At step 2, the UEs (e.g. the UE 1 502 and the UE2 504) perform WLAN direct discovery/communication setup indication to a prose server 506. At step 3, the communication or discovery between the UE1 502 and UE2 504 is established over the WLAN radio access technology (e.g. WLAN peer-to-peer (P2P)). At step 4, the UE2 504 moves out of the WLAN communication range. At step 5, the UEs periodically measures signal conditions for (a) the WLAN and (b) the LTE prose radio access technology and automatically reselects from the WLAN to the LTE prose radio access technology based on comparison of the measured signal condition and a threshold signal condition. The threshold signal condition is preset by the prose server. The threshold signal condition includes at least one of (i) a signal condition, (ii) a QoS requirement or (iii) presence of number of announcing other UE's in the WLAN or LTE prose access technology in proximity area. At step 6, the UEs performs LTE prose direct setup communication/discovery indication to the prose server 506. At step 7, the communication/discovery between the UE1 502 and UE2 504 is established over the LTE prose radio access technology based on the received PC5 discovery message embedded within the WLAN discovery frame.

In an embodiment, the UE's sends the determined signal condition or the QoS requirement to the prose server 506 and a network redirects the selection from the WLAN to the LTE prose radio access technology communication or vice versa based on the signal condition or the QoS requirement. In another embodiment, the network provisions or configures authorization of the UE's autonomously to reselect from the WLAN to the LTE prose radio access technology or vice versa in at least one of (a) universal integrated circuit card (UICC), (b) mobile equipment (ME) or (c) user equipment (UE), that are adapted to be used in the out of coverage scenarios.

The UEs (e.g. the UE1 and the UE2) are also allowed to discover or communicate through the WLAN radio access technology when the UE's already established the communication using the LTE prose radio access technology and the UE's are within the WLAN range. The UEs directly establishes the WLAN communication/discovery without informing the network. In an embodiment, the UEs request the network to establish the WLAN communication/discovery between the UEs. The UEs request to the network is performed by at least one of (a) sending a new message or (b) reusing an existing EPC support for WLAN direct discovery and communication. The new message includes (a) user IDs of the UEs (e.g. the UE1 and the UE2) and (b) WLAN link layer (WILL) IDs of the UEs (e.g. the UE1 and the UE2).

In another embodiment, the UEs get release from the direct communication with other UEs over the LTE prose radio access technology utilizing a "direct_communication_release" procedure with new release cause as "# direct connection will be established over WLAN". The UEs establishes the communication over the WLAN radio access technology and continues the communication after successful completion of the direct communication release procedures in the LTE ProSe radio access technology. In yet another embodiment, the UE's establishes the discovery/ communication over the LTE prose radio access technology on identification of the UEs out of a WLAN communication range.

Figure 7:
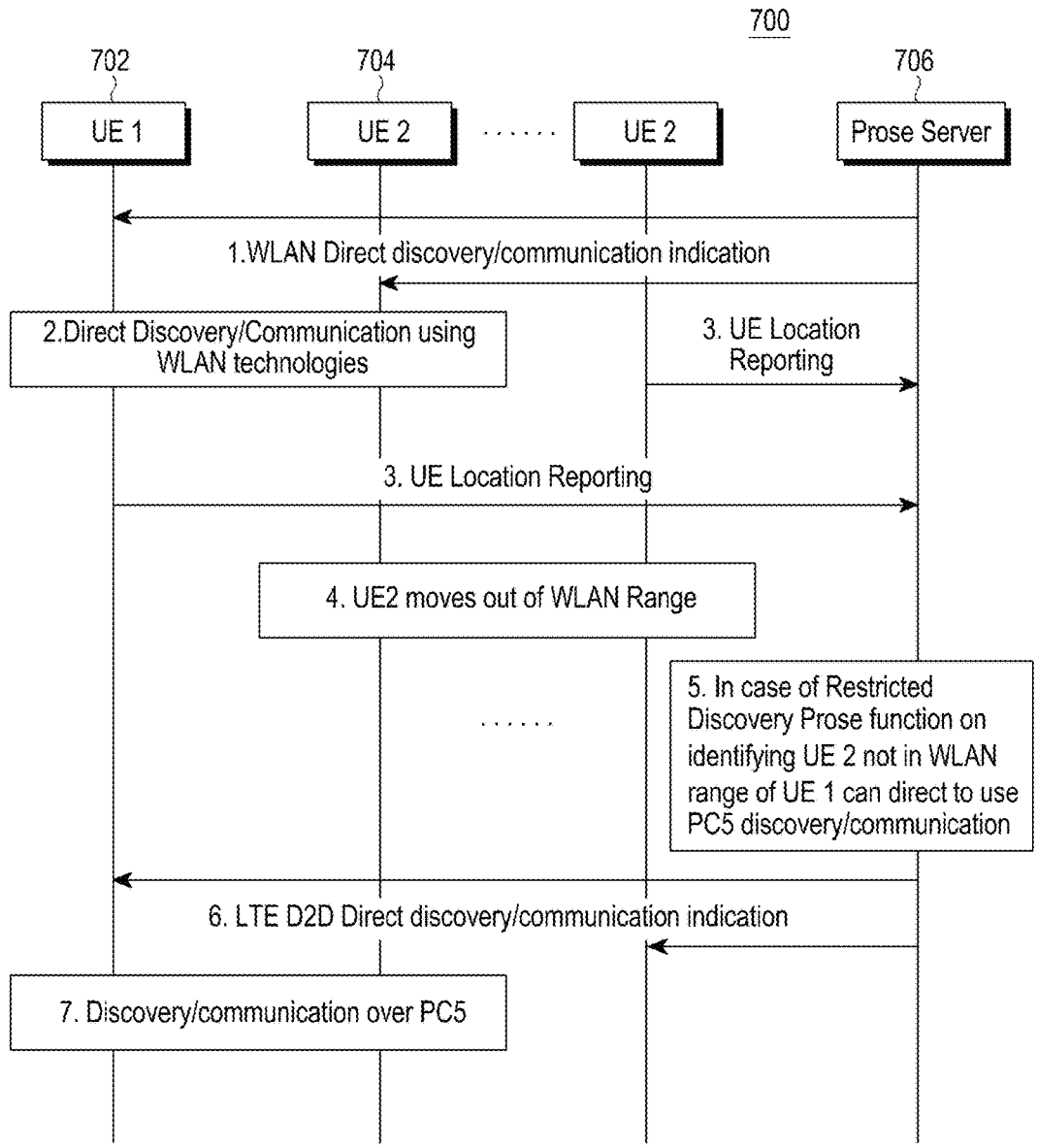
FIG. 7 is a schematic flow diagram illustrating use case of UE assisted LTE prose discovery radio access selection when UEs in WLAN discovery range moving away, according to an embodiment of the present invention.
Figure 8:
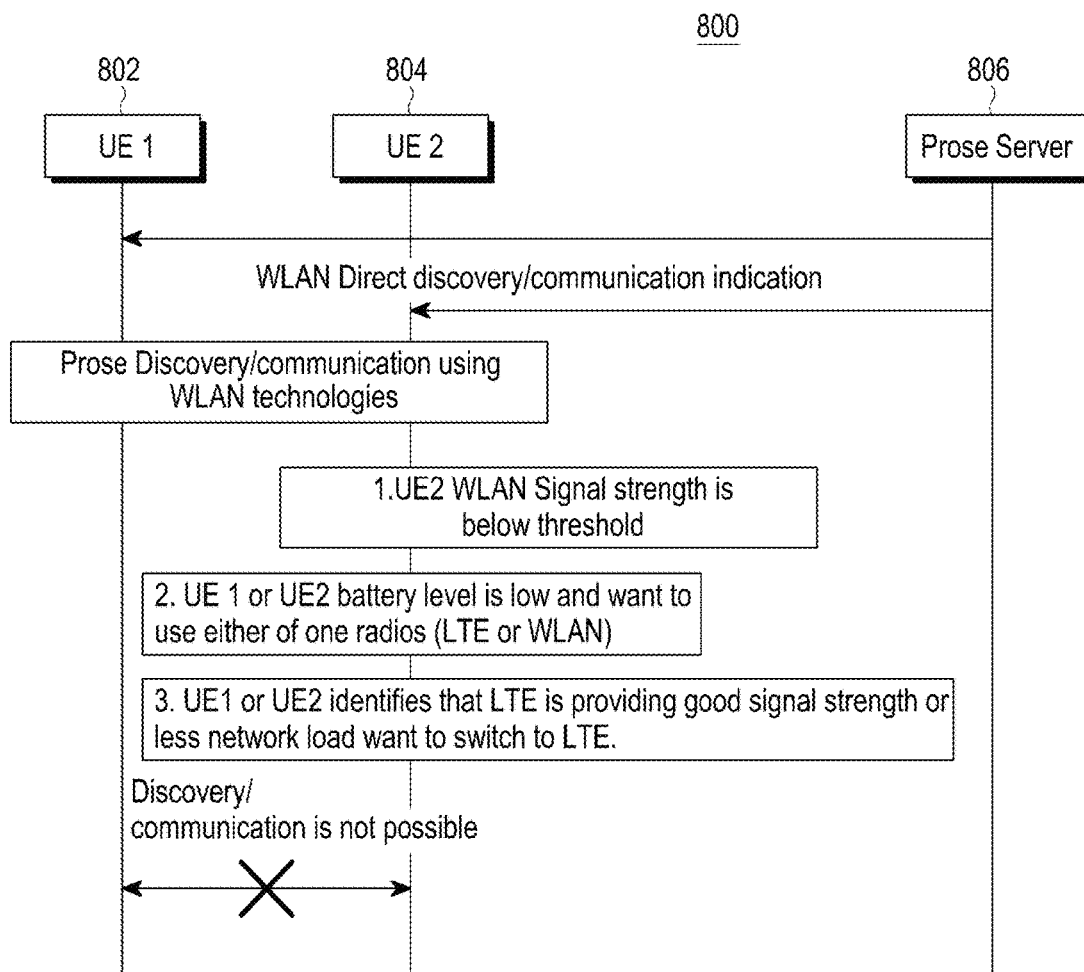
FIG. 8 is a schematic diagram illustrating an issue of UE assisted WLAN discovery radio access selection based on UE signal condition or performance status, according to an existing art.

FIG. 7 is a schematic flow diagram 700 illustrating use case of UE assisted prose discovery radio access selection when UEs in WLAN discovery/communication range moving away, according to an embodiment of the present invention. FIG. 7 provides a solution for the scenario described in FIG. 6. According to this embodiment, at step 1, a prose server 706 instructs UE1 702 and UE2 704 to perform WLAN direct discovery/communication indication when the UEs (e.g. UE1 702 and UE2 704) are within WLAN communication or discovery range. At step 2, the discovery/ communication is established between the UEs over WLAN radio access technology. At step 3, the UE1 702 reports their respective location periodically to the prose server 706. At step 4, the UE2 704 moves out of the WLAN communication range from the UE1 702. At step 5, the prose server 706 identifies the restricted discovery/communication, upon the UE2 704 not in the WLAN communication/discovery range, instructs/directs the UE1 702 to utilize LTE Prose radio access technology for discovery/communication. At step 6, the prose server 706 instructs the UEs to perform the LTE prose direct discovery/communication indication. At step 7, the discovery/communication between the UEs is established over the LTE prose radio access technology.

In an embodiment, the UE1 702 (e.g. discoverer UE) can request the prose server 706 to raise the periodic location update request to the UE2 704 (e.g. the UE for which the communication is to be established) to select the relevant radio access technology, when the location of the UE2 704 is not in the WLAN communication/discovery range with the UE1 702. In another embodiment, the UEs optimizes the location update to the prose server 706 on detecting movement of the UEs movement by itself. In an embodiment, the movement of the UEs is determined using information obtained from at least one of (a) sensors or (b) global positioning system (GPS).

Figure 9A:
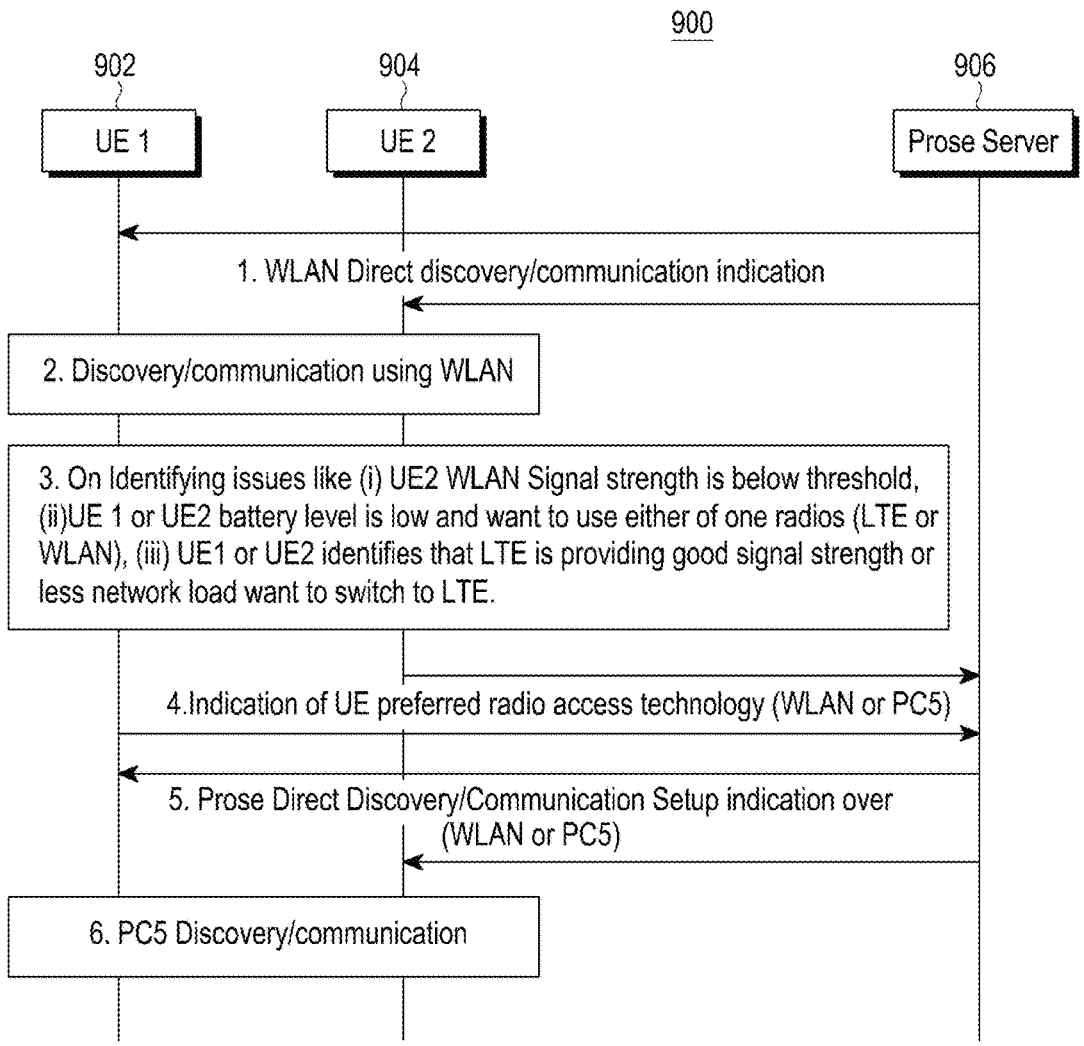
FIG. 9*a* is a schematic flow diagram illustrating use case of prose server assisted discovery/communication radio access selection, according to an embodiment of the present invention.

FIG. 9a is a schematic flow diagram 900 illustrating a use case of prose server assisted prose discovery/communication radio access selection, according to an embodiment of the present invention. FIG. 9a illustrates a first solution for the issue or scenario described in FIG. 8. According to this embodiment, at step 1, a prose server 906 instructs UE1 902 and UE2 904 to perform WLAN direct discovery/communication indication. At step 2, discovery or communication is established between the UEs over WLAN radio access technology. At step 3, the UEs (e.g. UE1 902 and UE2 904) determine connection establishment condition of at least one of (a) a WLAN signal strength is below a threshold signal strength, (b) a battery level of the UEs is low and decides to communicate through at least one of (i) the WLAN radio access technology or (ii) the LTE prose radio access technology, or (c) the LTE prose is providing at least one of good signal strength or less network load. At step 4, the UEs send a request to the prose server 906 indicating the UEs preference for selection of the radio access technology. At step 5, the prose server 906 instructs the UEs to communicate/ discover with the desired radio access technology. At step 6, the communication/discovery is established between the UEs over the LTE prose radio access technology.

In an embodiment, the prose server 906 also rejects the radio access technology selection request with a valid cause such as either UE1 or UE2 not authorized for requested access technology or as per network or operator policy requirements. In an embodiment, the prose server 906 allows the UEs to switch from one radio access technology to another radio access technology without receiving the request form the UEs for selection of the radio access technology. In another embodiment, the network provisions an operator policy for selection of the radio access technology in at least one of (a) UEs, (b) UICC or (c) ME that are adapted to be used in out of the coverage conditions.

Figure 9B:
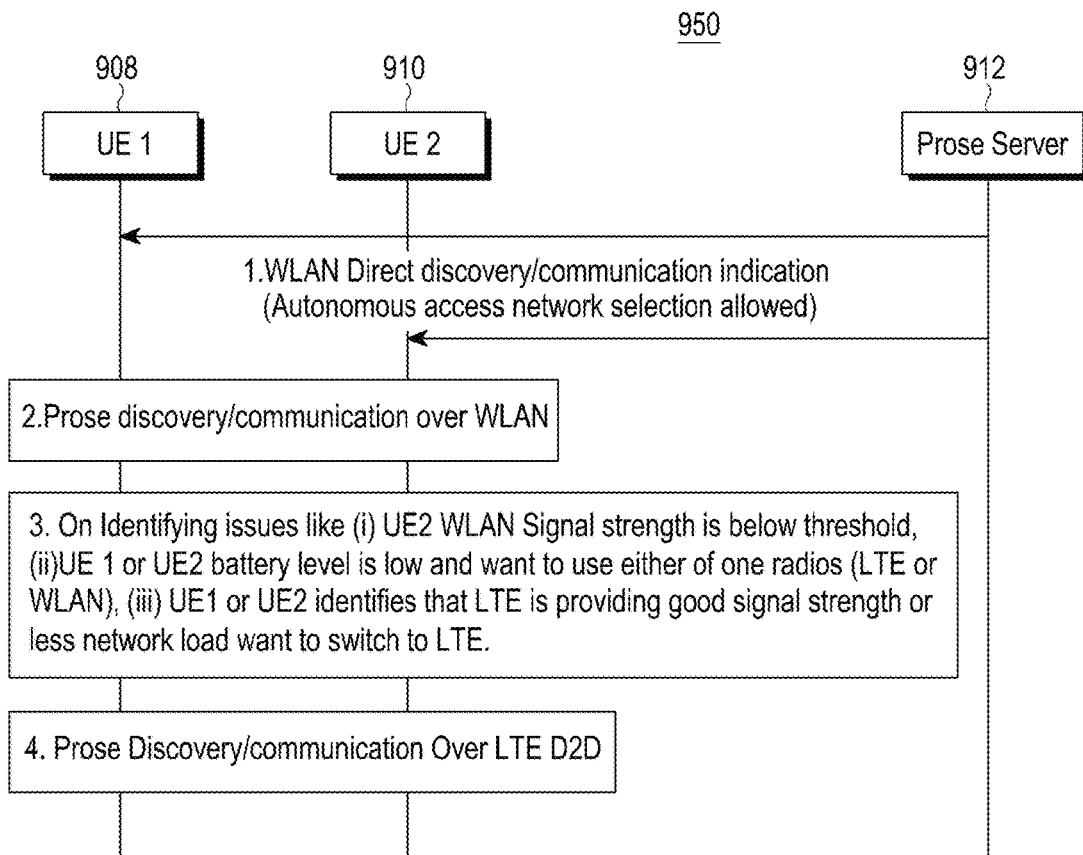
FIG. 9*b* is a schematic flow diagram illustrating use case of UE assisted autonomous prose discovery radio access selection, according to an embodiment of the present invention.
Figure 10:
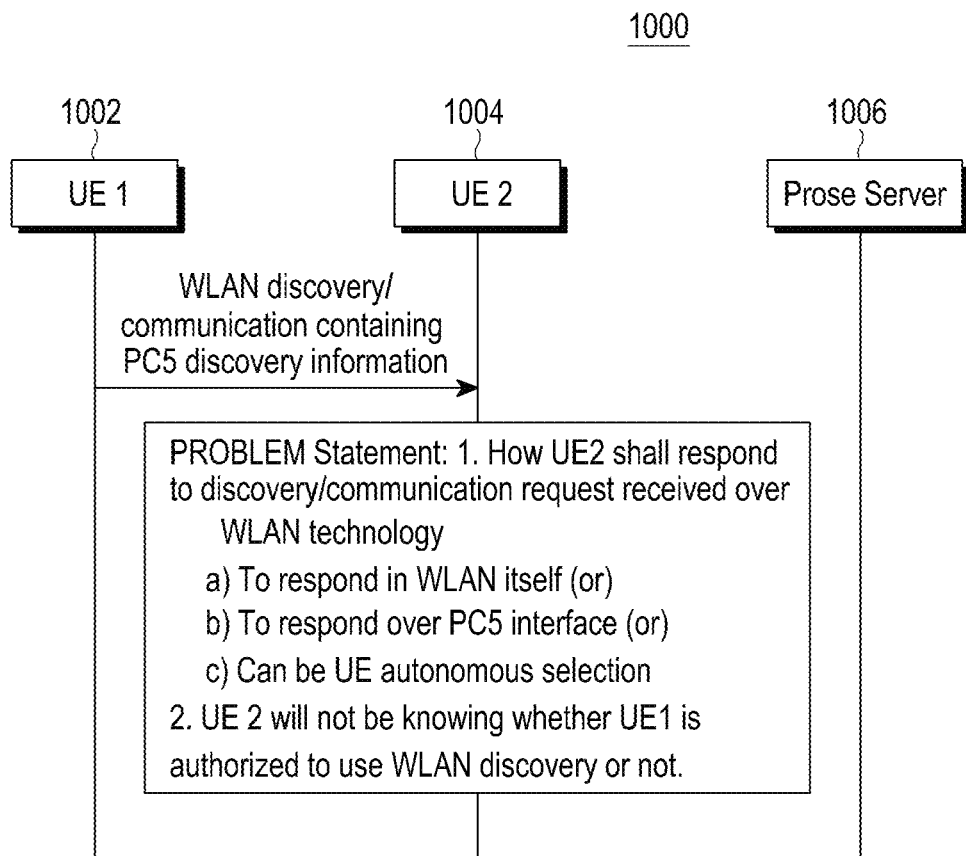
FIG. 10 is schematic diagram illustrating an issue of Gaps in handling of PC5 Discovery message received over WLAN discovery or communication, according to an existing art.

FIG. 9b is a schematic flow diagram 950 illustrating a use case of UE assisted autonomous prose discovery/communication radio access selection, according to an embodiment of the present invention. FIG. 9b illustrates a second solution for the issue or scenario described in FIG. 8. According to this embodiment, at step 1, a prose server 912 instructs UE1 908 and UE2 910 to perform a WLAN direct discovery/ communication indication. At step 2, the UEs (e.g. the UE1 and the UE2) enable direct discovery/communication over WLAN radio access technology. At step 3, the UEs determines connection establishment condition of at least one of (a) a WLAN signal strength is below a threshold signal strength, (b) a battery level of the UEs is low and decides to communicate through at least one of (i) the WLAN radio access technology or (ii) the LTE prose radio access technology, or (c) the LTE prose is providing at least one of good signal strength or less network load. At step 4, the UEs autonomously enables the communication or discovery over the LTE prose radio access technology. In another embodiment, the network provisions an operator policy for the selection of the radio access technology configured in at least one of (a) UEs, (b) UICC or (c) ME that are adapted to be used in out of the coverage scenarios.

Figure 11:
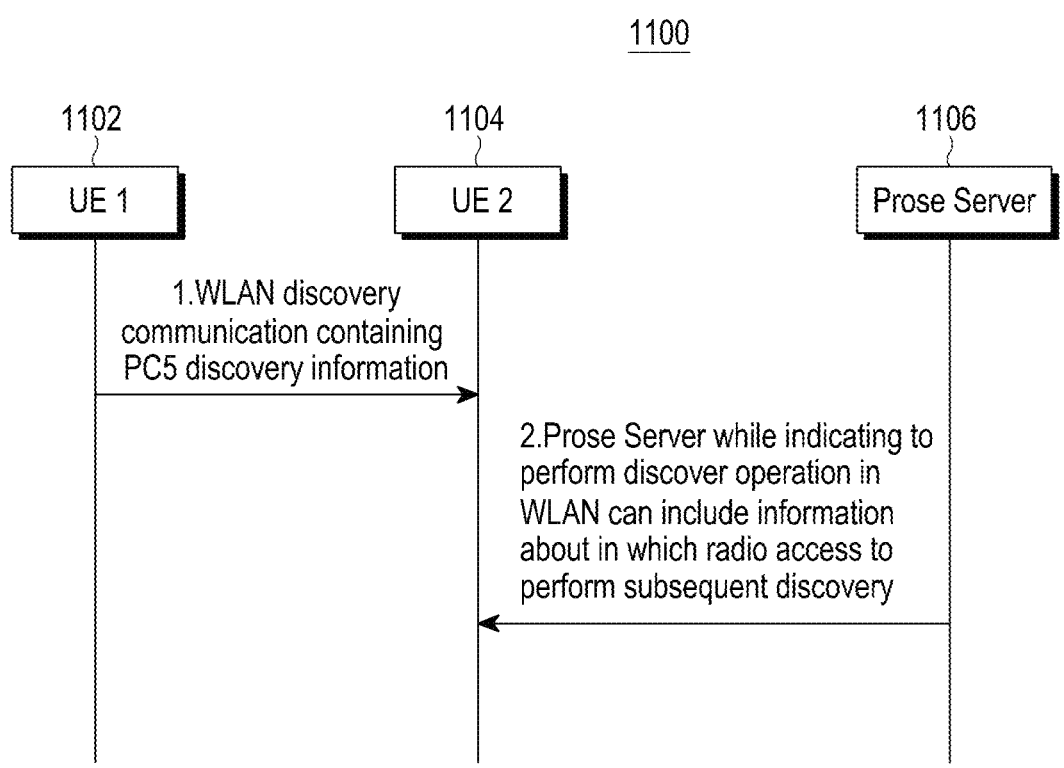
FIG. 11 is a schematic flow diagram illustrating a use case of network assisted selection of WLAN or LTE Prose radio access technology, when PC5 message is received over WLAN discovery or communication, according to an embodiment of the present invention.

FIG. 11 is a schematic flow diagram 1100 illustrating a use case of network assisted selection of WLAN or LTE Prose radio access technology, when PC5 message is received over WLAN radio access technology, according to an embodiment of the present invention. FIG. 11 illustrates a first solution for the issue or scenario described in FIG. 10. According to this embodiment, at step 1, a UE1 1102 performs WLAN discovery or communication by transmitting a WLAN discovery/communication message that includes a PC5 discovery information. The PC5 discovery information notifies the UE1's 1102 preferences for selection of radio access technology to a UE2 1104 for further operations. At step 2, a prose server 1106 notifies the UE2 1104 for selecting the radio access technology to perform subsequent discovery operations (e.g. discovery response, communication request, etc.) on receiving the PC5 discovery message over the WLAN radio access technology. In an embodiment, the PC5 direct discovery message includes a field indicating UE1's 1102 preference for selection of the radio access technology for further operations.

Figure 12:
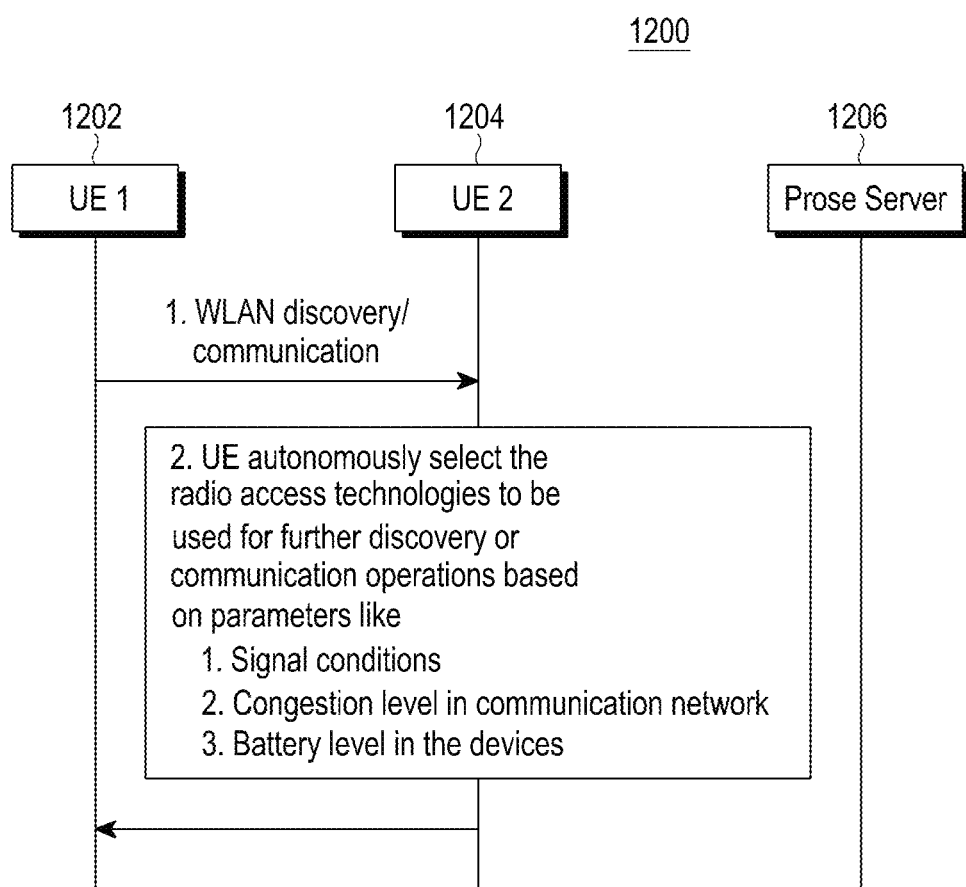
FIG. 12 is a schematic flow diagram illustrating a method of UE's autonomous selection of WLAN or LTE Prose radio access technology, when PC5 message is received over WLAN, according to an embodiment of the present invention.
Figure 13:
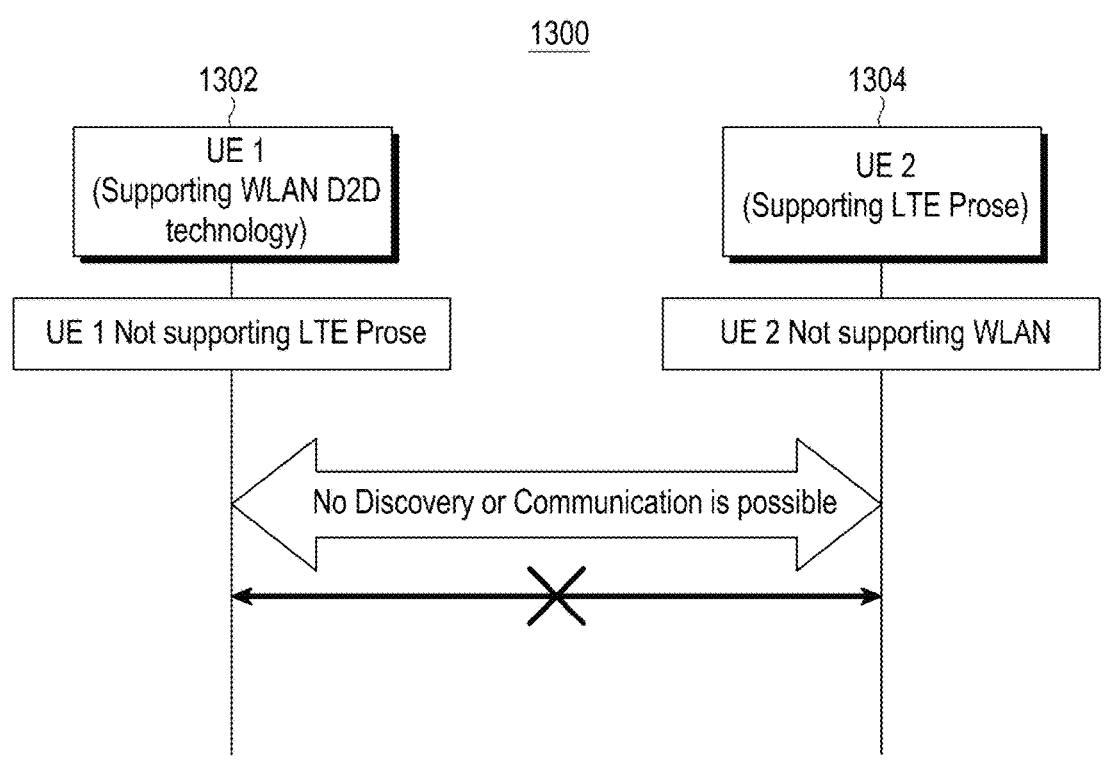
FIG. 13 is a schematic diagram illustrating an issue of interworking between WLAN mode only and Prose mode only supported devices, according to an existing art.

FIG. 12 is a schematic flow diagram 1200 illustrating a method of UEs autonomous selection of WLAN or LTE Prose radio access technology, when a PC5 discovery message is received over WLAN, according to an embodiment of the present invention. FIG. 12 illustrates a second solution for the issue or scenario described in FIG. 10. According to this embodiment, at step 1, a UE1 1202 performs WLAN discovery or communication with a UE2 1204 by transmitting a WLAN discovery/communication message that includes a PC5 discovery information. The PC5 discovery information notifies the UE1's 1202 preferences for selection of radio access technology to the UE2 1204 for further operations. The UEs (e.g. the UE1 1202 and the UE2 1204) determines at least one of (a) signal conditions, (b) a congestion level in a communication network or (c) battery level in the UEs. At step 2, the UE2 1204 autonomously selects the radio access technologies that are to be used for further discovery or communication operations based on the above determined parameters.

Figure 14:
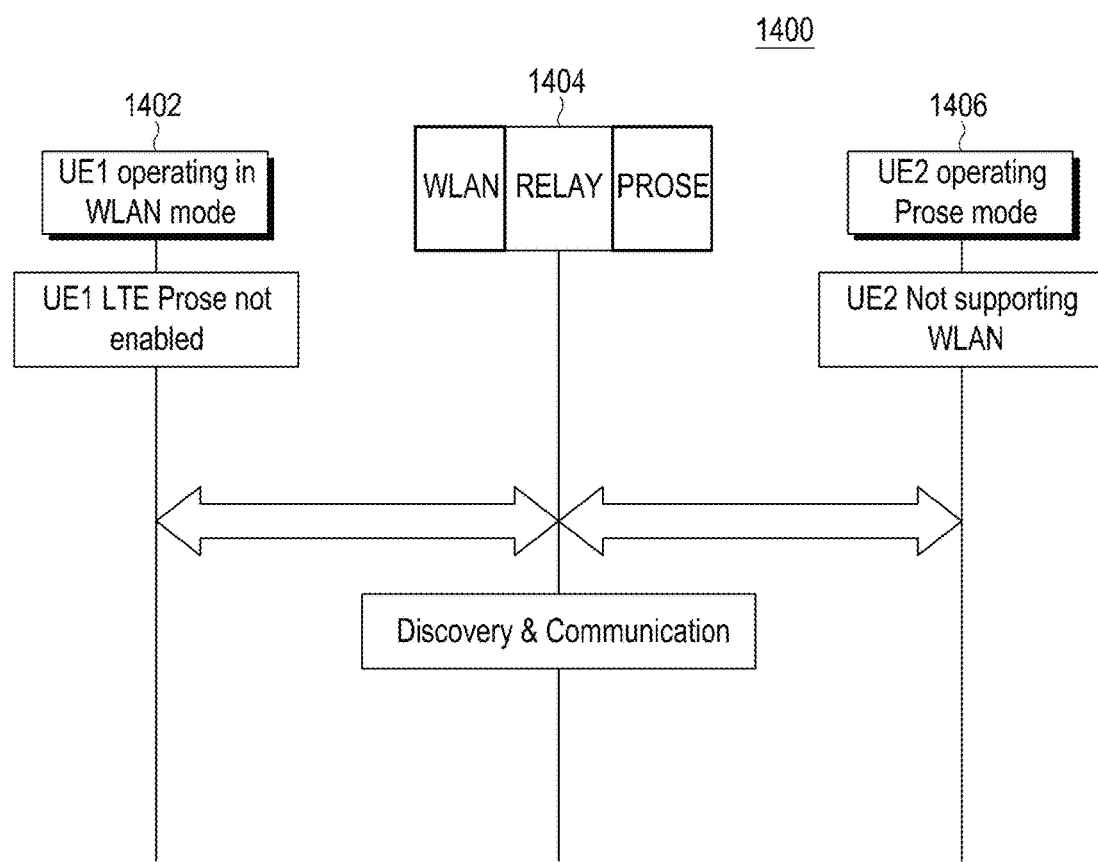
FIG. 14 is a schematic flow diagram illustrating use case of Relay device acting as an interworking node to support interworking WLAN mode only and Prose mode only supported devices, according to an embodiment of the present invention.

FIG. 14 is a schematic flow diagram 1400 illustrating use case of a Relay device 1404 functioning as an interworking node to support interworking WLAN mode only and Prose mode only supported devices, according to an embodiment of the present invention. FIG. 14 provides a solution to a scenario/issue described in FIG. 13. The relay device 1404 monitors or listens for at least one of (a) PC5 Announce/Monitor over LTE prose link or (b) NAN Publish/Monitor or Wi-Fi P2P frame over WLAN radio access technology simultaneously. The relay device 1404, on receiving a discovery frame of one radio access technology from a UE1 1402, converts and prepares a discovery frame for the other radio access technology for a UE2 1406 and start broadcasting/communicating on the other radio access technology. The relay device 1404, on receiving a discovery frame from one radio access technology, setups a communication path for the other radio access technology to enable transfer of data packets between UEs (e.g. the UE1 1402 and the UE2 1406). In an embodiment, a network provisions an operator policy for the network selection (or) configured in at least one of (a) the UE or (b) the UICC or (c) ME to be utilized during out of coverage conditions.

Figure 15:
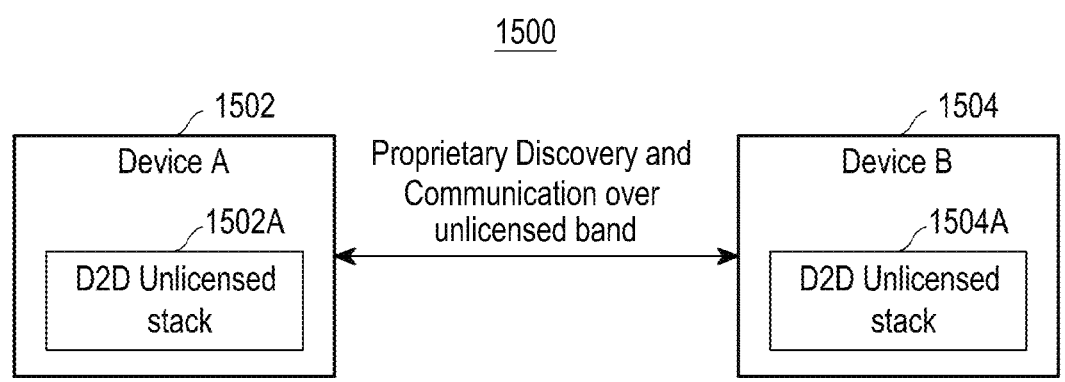
FIG. 15 is a schematic diagram illustrating a D2D communication between user devices over an unlicensed band, according to an embodiment of the present invention.

FIG. 15 is a schematic flow diagram 1500 illustrating a D2D communication between UEs over an unlicensed band, according to an embodiment of the present invention. According to this embodiment, a UE1 1502 and a UE2 1504 supports protocol D2D unlicensed stacks 1502A and 1504A respectively that enables the proprietary discovery and communication over LTE unlicensed bands without operator involvement. In an embodiment, PC5 messages of LTE ProSe can be used for performing direct discovery or communication procedures without network operator involvement or authorization or resource allocation. In another embodiment, UEs (the UE1 1502 and the UE2 1504) can utilize a different set of messages or procedures for performing direct discovery and communication over unlicensed band. In an embodiment, UEs can download certain application(s) on to their devices which will be functioning as an interface layer for forming new messages/procedures across different original equipment manufacturer (OEM) devices to perform direct discovery and communication procedures.

Figure 16:
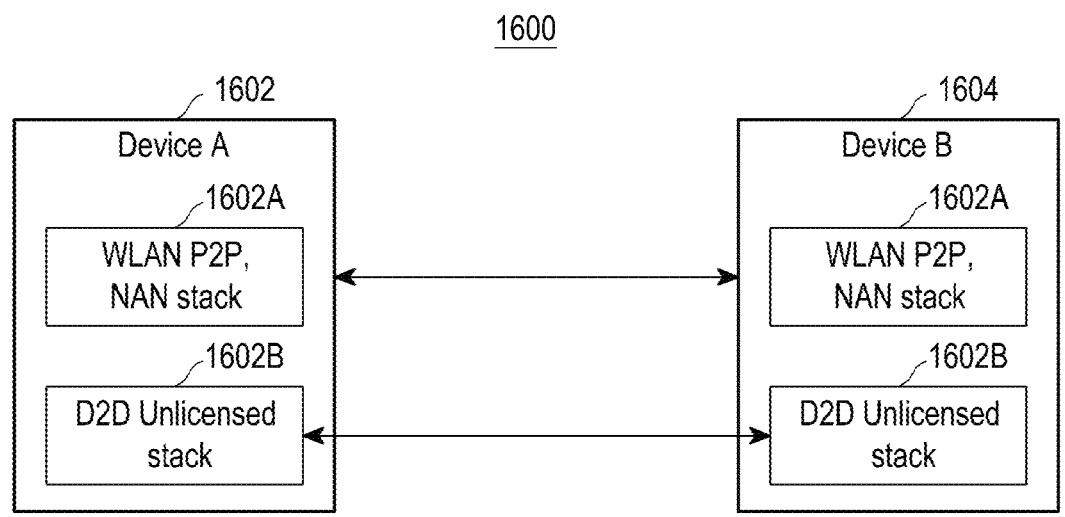
FIG. 16 is a schematic diagram illustrating a D2D communication between user devices over an unlicensed band and WLAN stacks, according to an embodiment of the present invention.

FIG. 16 is a schematic flow diagram 1600 illustrating a D2D communication between UEs over an unlicensed band and WLAN stack, according to an embodiment of the present invention. According to this embodiment, a UE1 1602 and a UE2 1604 supports protocol D2D unlicensed stacks 1602A and 1604A and WLAN stacks 1602B and 1604B respectively that enables the proprietary discovery and communication over LTE unlicensed bands and WLAN radio access technologies respectively without operator involvement. In an embodiment, the protocol D2D stack includes a logic implemented to avoid any collision among long term evolution-unlicensed LTE-U (LAA), Wi-Fi P2P and the unlicensed LTE D2D, in ISM band.

Figure 17:
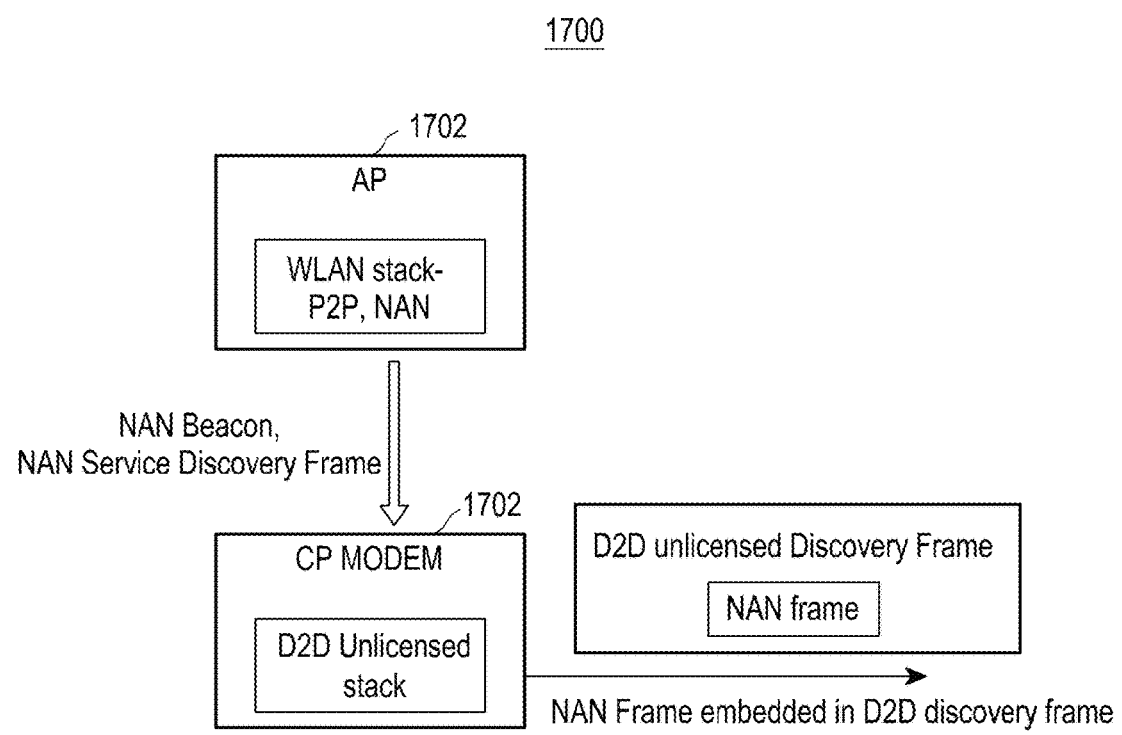
FIG. 17 is a schematic diagram illustrating interworking between WLAN and ProSe D2D modules, according to an embodiment of the present invention.

FIG. 17 is a schematic diagram 1700 illustrating interworking between WLAN and ProSe D2D modules, according to an embodiment of the present invention. According to this embodiment, an application processor (AP) 1702 including the WLAN stack (e.g. P2P, NAN) communicates with a CP modem 1704 including a D2D unlicensed stack. The communication between the AP 1702 and the CP modem 1704 is initiated by transmitting at least one of a NAN beacon and a NAN service discovery frame from the AP 1702 to the CP modem 1704 and embedding the NAN frame in a D2D discovery frame. In an embodiment, an application developer processing the AP can utilize at least one of a WLAN radio access technology or a LTE prose radio access technology.

Figure 18:
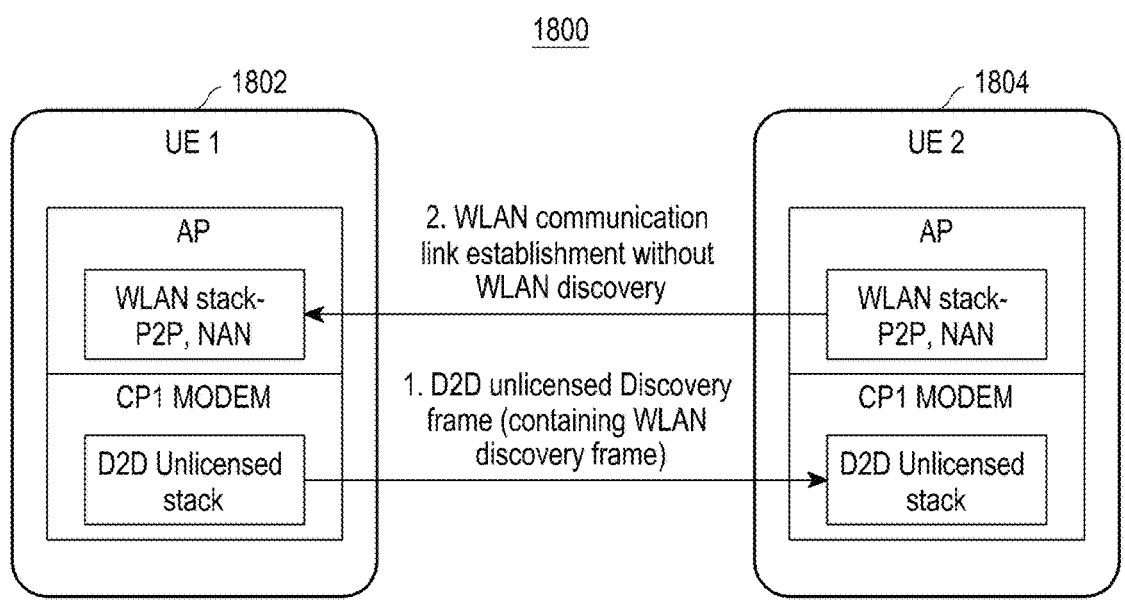
FIG. 18 is a schematic diagram illustrating D2D communication by including a WLAN discovery frame in a PC5 discovery message, according to an embodiment of the present invention.

FIG. 18 is a schematic diagram 1800 illustrating D2D communication including a WLAN discovery frame in a PC5 unlicensed discovery message, according to an embodiment of the present invention. According to this embodiment, a UE1 1802 includes a AP1 and a CP1 modem. Similarly, a UE2 1804 includes a AP2 and a CP2 modem. The APs (e.g. the AP1 and the AP 2) include WLAN Stacks. The CP modems (e.g. the CP1 and the CP 2) include D2D unlicensed stacks. The UE1 1802 sends the PC5 unlicensed discovery message to the UE2 1804 while establishing the discovery or communication with the UE2 1804 over LTE prose radio access technology. The PC5 unlicensed discovery message includes the WLAN discovery frame (e.g. NAN service ID). The UE2 1804 upon receiving the PC5 unlicensed discovery message along with the WLAN discovery frame indicates to the WLAN stacks in order to establish the communication with the UE1 1802 over the WLAN radio access technology without explicit WLAN discovery.

Figure 19:
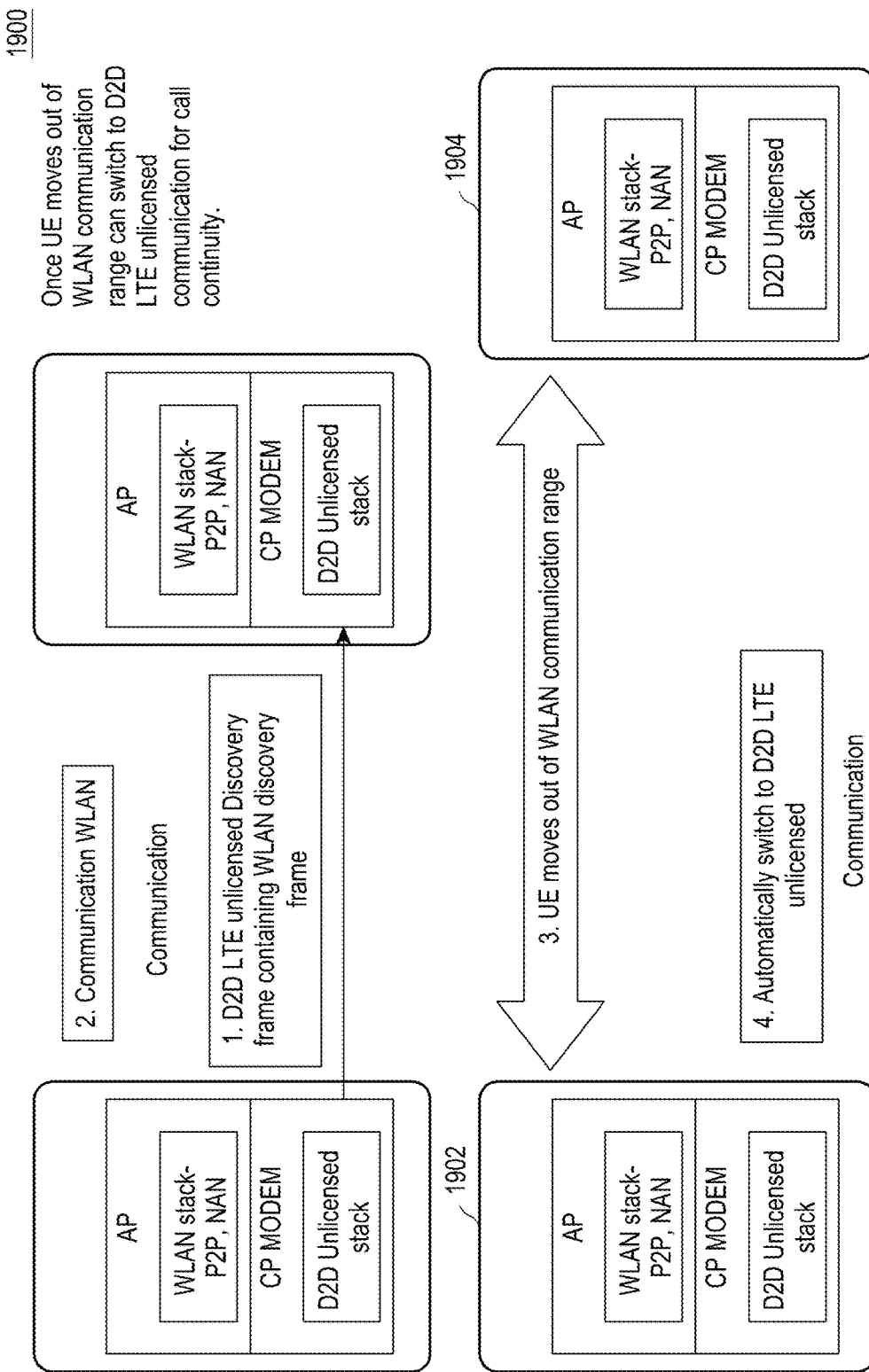
FIG. 19 is a schematic diagram illustrating a call continuity when UEs, include a WLAN discovery frame in a PC5 unlicensed discovery message, moving out of WLAN range, according to an embodiment of the present invention.

FIG. 19 is a schematic diagram 1900 illustrating a call continuity when UEs, include a WLAN discovery frame in a PC5 unlicensed discovery message, moving out of WLAN range, according to an embodiment of the present invention. According to this embodiment, a UE1 1902 includes a AP1 and a CP1 modem. Similarly, a UE2 1904 includes a AP2 and a CP2 modem. The Aps (e.g. the AP1 and the AP2) include WLAN Stacks. The CP modems (e.g. the CP1 and the CP2) include D2D unlicensed stacks. When either of the UEs (e.g. the UE1 1902 and the UE2 1904) move out of the WLAN communication range, upon confirmation by the WLAN stacks, the UEs automatically switch to LTE D2D unlicensed bands for establishing the communication or discovery between the UEs.

Figure 20:
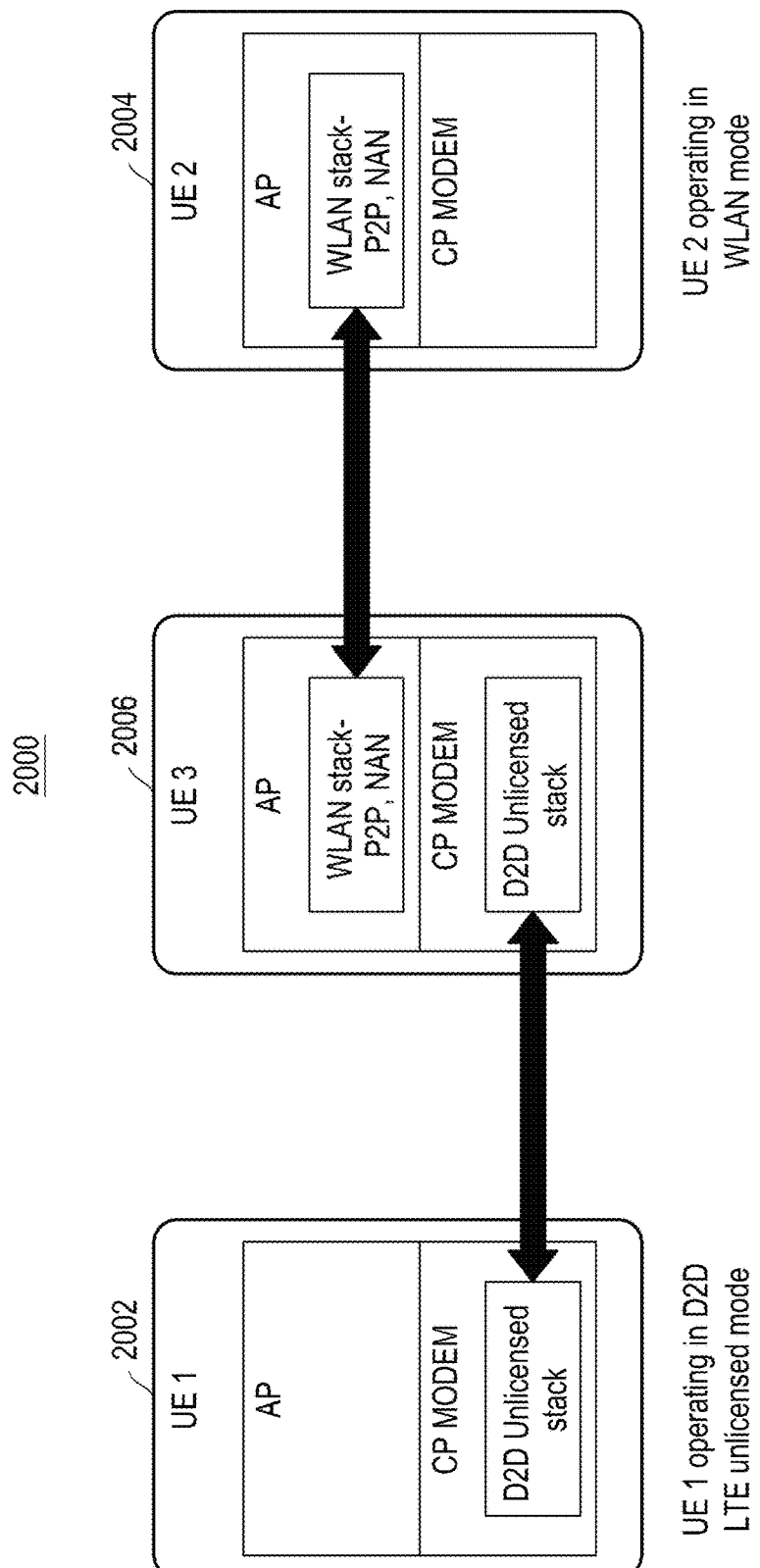
FIG. 20 is a schematic diagram illustrating a relay device acting as an interworking node for establishing communication between WLAN mode only and LTE prose Mode only supported UEs, according to an embodiment of the present invention.

FIG. 20 is a schematic diagram 2000 illustrating a relay device UE3 2006 operating as an interworking node for establishing communication between WLAN mode only and LTE prose Mode only supported UEs, according to an embodiment of the present invention. Consider UE1 2002 operating in a LTE unlicensed mode only and UE2 2004 operating in a WLAN mode only, wherein direct communication is unable to be established between the UE1 2002 and the UE2 2004. According to this embodiment, FIG. 20 provides a solution for the above-mentioned scenario by including a UE3 2006 that functions as the internetworking node or the relay device to establish the communication between the UE1 2002 and the UE2 2004. The UE1 2002 establishes the communication or discovery with the UE3 2006 over D2D unlicensed band through a PC5 unlicensed discovery message. The PC5 unlicensed discovery message includes a WLAN discovery frame. The UE3 2006 then establishes communication with the UE2 2004 over WLAN radio access technology without performing explicit discovery, thus establishing the communication or discovery between the UE1 2002 and UE2 2004.

Figure 21:
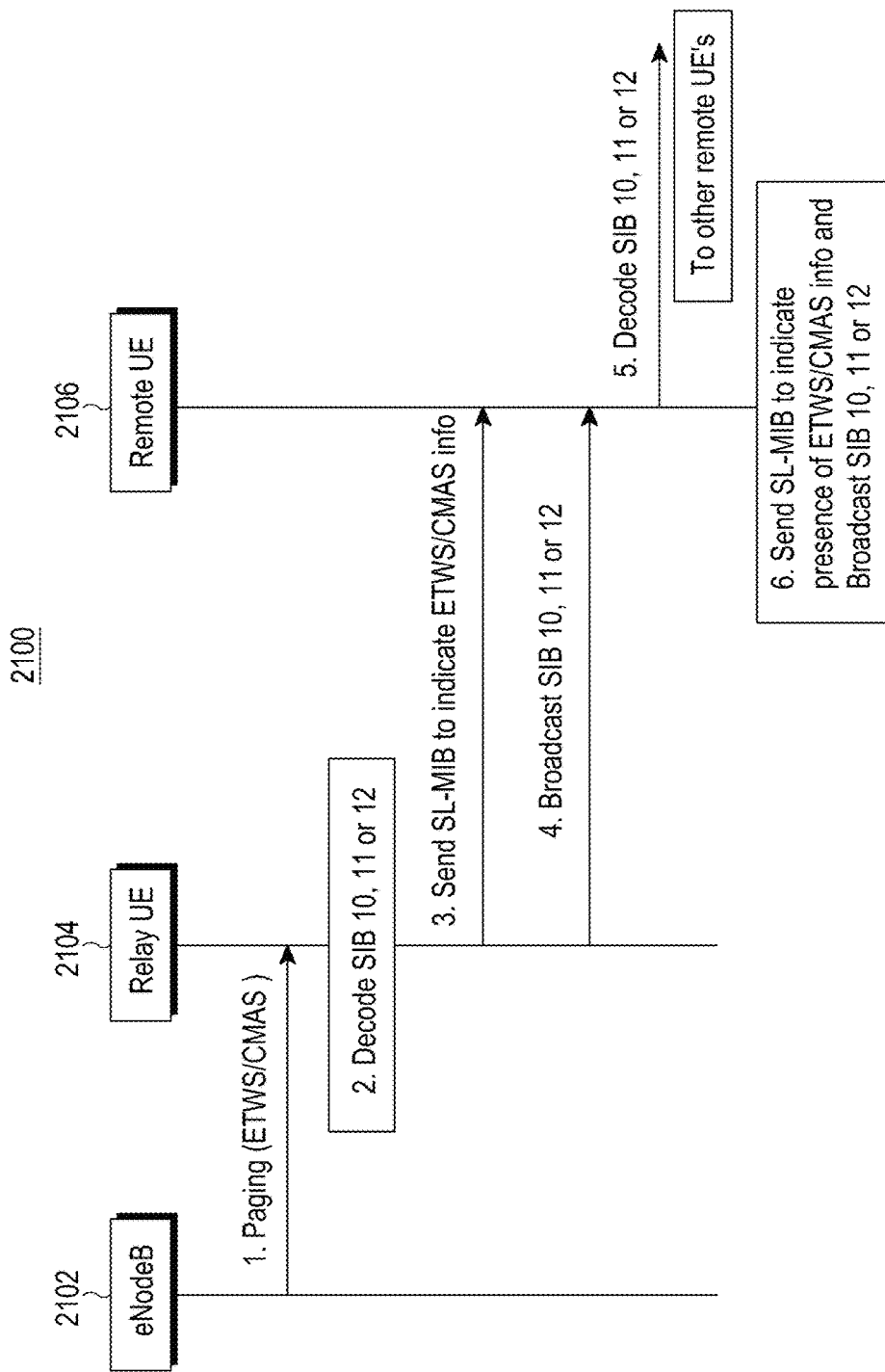
FIG. 21 is a schematic flow diagram illustrating a use case of announcement of ETWS or CMAS information over PC5 LTE prose radio access technology, when UEs are in out of coverage conditions, according to an embodiment of the present invention.

FIG. 21 is a schematic flow diagram 2100 illustrating use case of announcement of ETWS or CMAS information over PC5 LTE prose radio access technology, when UEs are in out of coverage conditions, according to an embodiment of the present invention. Consider in case of a natural disaster (e.g. Tsunami, Earthquake), 3GPP has standardized an Earthquake and Tsunami warning service (ETWS) or Commercial Mobile Alert system (CMAS) to immediately notify emergency information to users, in which the users (UEs) who are in the out of coverage conditions are not able to receive the ETWS/CMAS. FIG. 21 provides a solution for the above-mentioned case by including a relay UE 2104. At step 1, an evolved node B (enodeB) 2102 upon identification of the natural disaster (e.g. Tsunami, Earthquake) performs paging ETWS/CMAS and communicates to the relay UE 2104. At step 2, the relay UE 2104 decodes system information block (SIB). At step 3, the relay UE 2104 further transmits side link master information block (SL-MIB) to a remote UE 2106, which is in the out of coverage condition, to indicate ETWS/CMAS information. At step 4, the relay UE 2104 broadcasts the SIB to the remote UE 2106. At step 5, the remote UE 2106 decodes the SIB. At step 6, the remote UE 2106 transmits the side link master information block (SL-MIB) to other remote UEs in order to indicate the ETWS/CMAS information. The remote UE 2106 further broadcasts the SIB to the other remote UEs. In an embodiment, new SL-SIB is included in the ETWS/CMAS information to send to the remote UE 2106. SIB 10 and SIB 11 are used for ETWS whereas SIB 12 is used for CMAS in LTE prose existing systems. In another embodiment, existing SL-MIB is modified to indicate the decoding of the new SL-SIB's. In yet another embodiment, side link paging channel (SL-PCH) is introduced from the relay UE 2104 to the remote UE 2106 for indicating the paging information. The relay UE 2104 also include a flag in SL-MIB to indicate the remote UE 2106 that there is some emergency information. The remote UE 2106 reads additional SIBs transmitted by the relay UE to acquire the emergency identification on identifying the SL MIB with emergency field.

Figure 22:
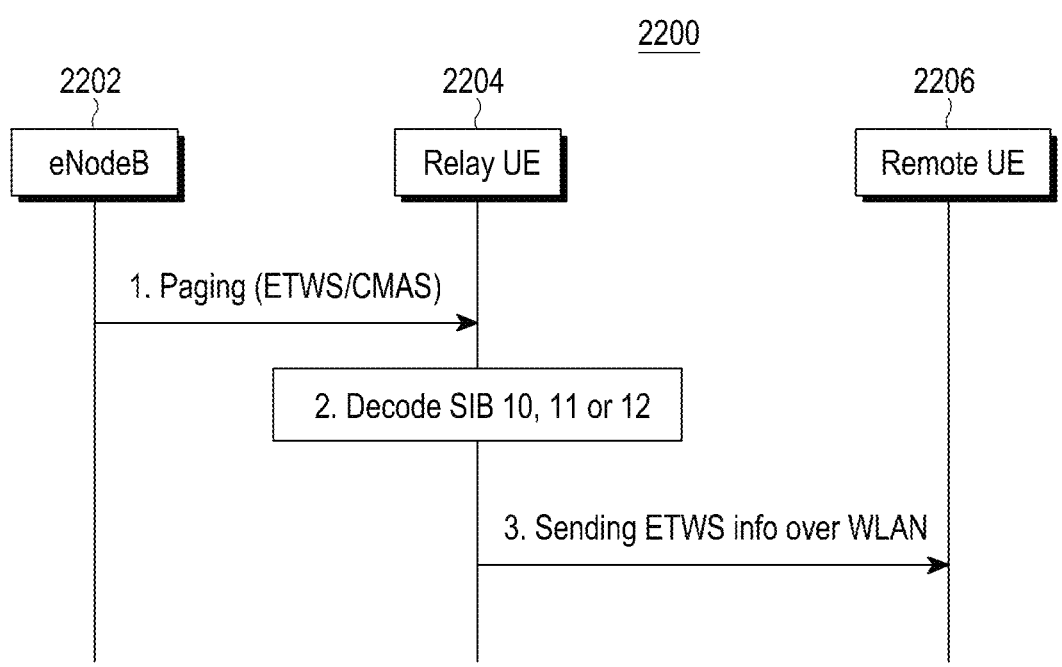
FIG. 22 is a schematic flow diagram illustrating a use case of announcement of ETWS or CMAS information over WLAN radio access technology, when UEs are in out of coverage conditions, according to an embodiment of the present invention.

FIG. 22 is a schematic flow diagram 2200 illustrating a use case of announcement of ETWS or CMAS information over WLAN radio access technology, when UEs are in out of coverage conditions, according to an embodiment of the present invention. Consider in case of a natural disaster (e.g. Tsunami or an Earthquake), 3GPP has standardized an Earthquake and Tsunami warning service (ETWS) or Commercial Mobile Alert system (CMAS) to immediately notify the emergency information to users, in which the users (remote UEs) who are in the out of coverage conditions are not able to receive the ETWS/CMAS. FIG. 22 provides a solution for the above-mentioned case by including a relay UE 2204. At step 1, an enodeB 2202 identifies the natural disaster and performs paging ETWS/CMAS and communicates to a relay UE 2204. At step 2, the relay UE 2204 decodes system information block (SIB). At step 3, the relay UE 2204 further receives the ETWS/CMAS information over LTE prose radio access technology and transmits the ETWS/CMAS information over the WLAN radio access technology to a remote UE 2206. The relay UE 2204 further maps the information to WLAN discovery frames and communicates to other remote UEs.

Figure 23:
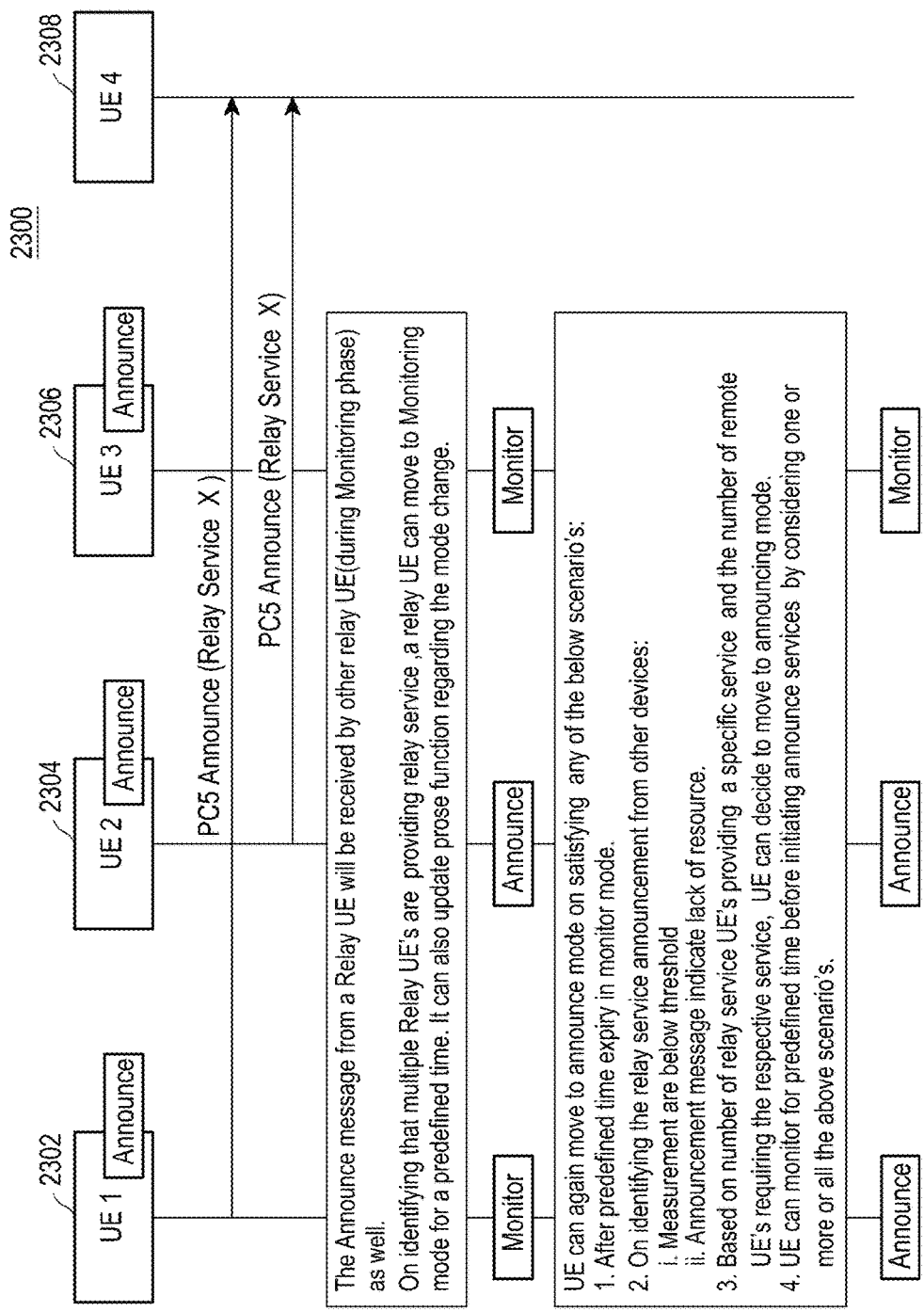
FIG. 23 is a schematic flow diagram illustrating a use case of announcement made by multiple relay UEs, according to an embodiment of the present invention.
Figure 24:
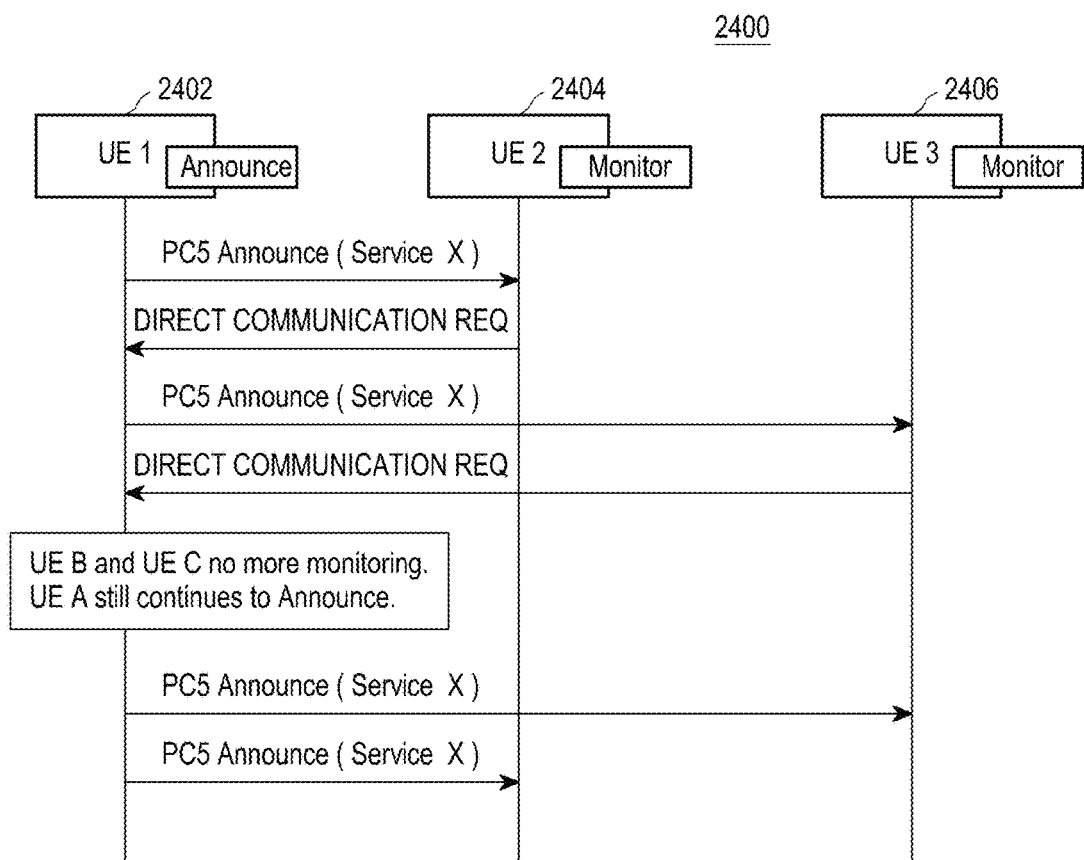
FIG. 24 is a schematic diagram illustrating an issue of announcing UE, according to an existing art.

FIG. 23 is a schematic flow diagram 2300 illustrating a use case of announcement made by multiple relay UEs, according to an embodiment of the present invention. According to this embodiment, a UE1 2302 (which is a prose relay UE A and UE A is not providing relay service and an announce mode) transmits a PC5 announce message to a UE2 2304 (which is a prose relay UE B and is an announce mode). The UE2 2304 (the UE B is not providing relay service) transmits a PC5 announce message to a UE4 2308). The PC5 announce message from a Relay UE (e.g. UE 1 2302 or UE 2 2304) will be received by other relay UE (e.g. a UE 3 2306 which is a prose relay UE C and is an announce mode) during monitoring phase) as well. On identifying that multiple Relay UE's (e.g. the UE1 2302, UE 2 2304 or UE3 2306) are providing relay service, at least one of the relay UEs can move to monitoring mode for a predefined time. It can also update prose function regarding the mode change.

A UE (e.g. the UE1 2302) can again move to announce mode on satisfying any of the scenario's for example, if after predefined time expiry in monitor mode, if on identifying the relay service announcement from other devices for example, a measurement are below threshold or an announcement message indicate lack of resource. Also, the UE can again move to announce mode on satisfying any of the scenario's, for example, if based on number of relay service UE's providing a specific service and the number of remote UE's requiring the respective service, the UE can decide to move to announcing mode. The UE can monitor for predefined time before initiating announce services by considering one or more or all the above scenarios.

A relay UE (e.g. the UE1 2302) identifies that there are multiple other relay UE's announcing in its proximity area for the same relay service code as it can capable of relaying. The relay UE identifies that there are multiple other relay UE's announcing certain relay service code shall move to monitor mode for that relay service code which will results in power saving and less network congestion. The relay UE identifies that there are multiple other relay UE's announcing certain relay service code but the status indicator field in announce message is zero (indicating no resources for serving remote UE's), shall move from monitoring to announcing mode for that relay service code. The relay UE operates in mode for a particular relay service on identifying/receiving a announcing request for same relay service code from multiple UE's can move to announce mode so all other UE's can operate in monitor mode, thus saving battery on all other devices and reducing network congestion. The relay UE on identifying certain events (such as low battery, congestion in network) can change its mode of operation from announce to monitor. The relay UE alternatively performing announcing and monitoring operations for pre-defined time periods periodically to ensure optimum power saving.

Figure 25:
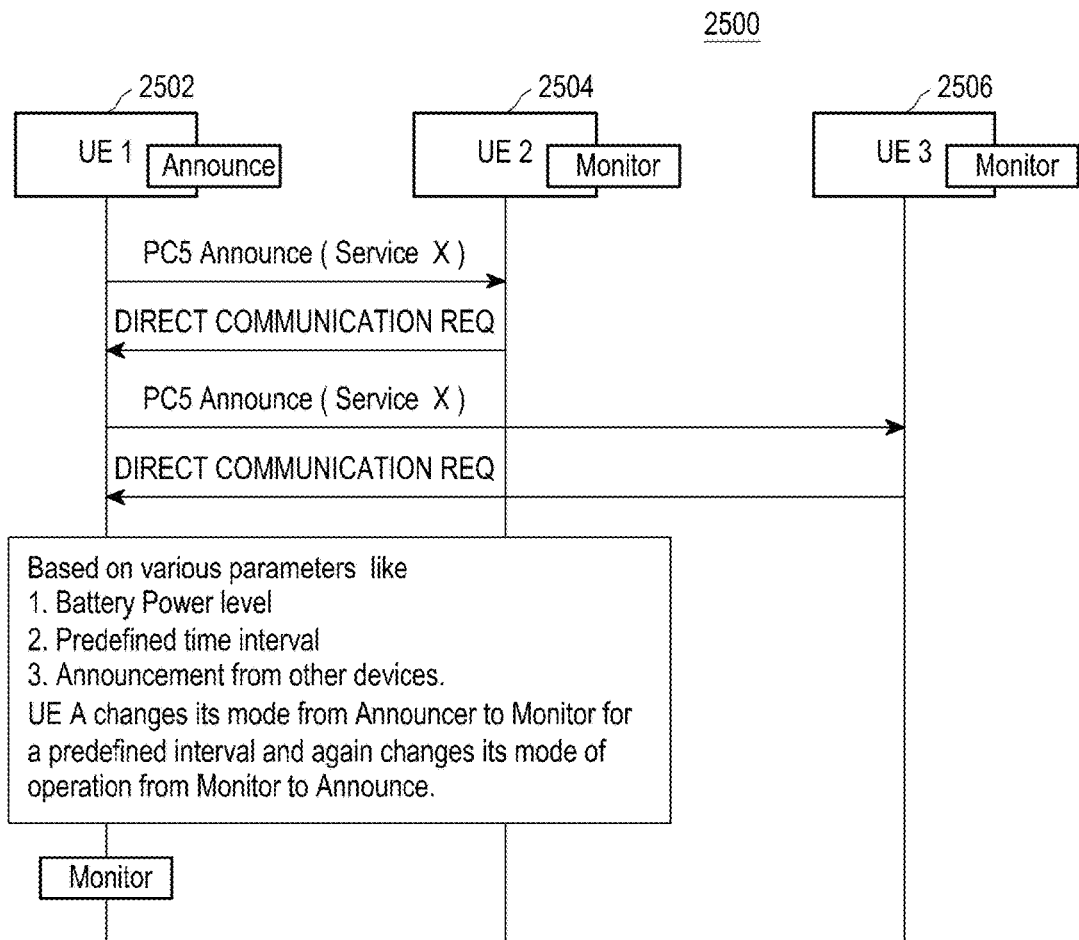
FIG. 25 is a schematic flow diagram illustrating a use case of announcing UE, according to an embodiment of the present invention.
Figure 26:
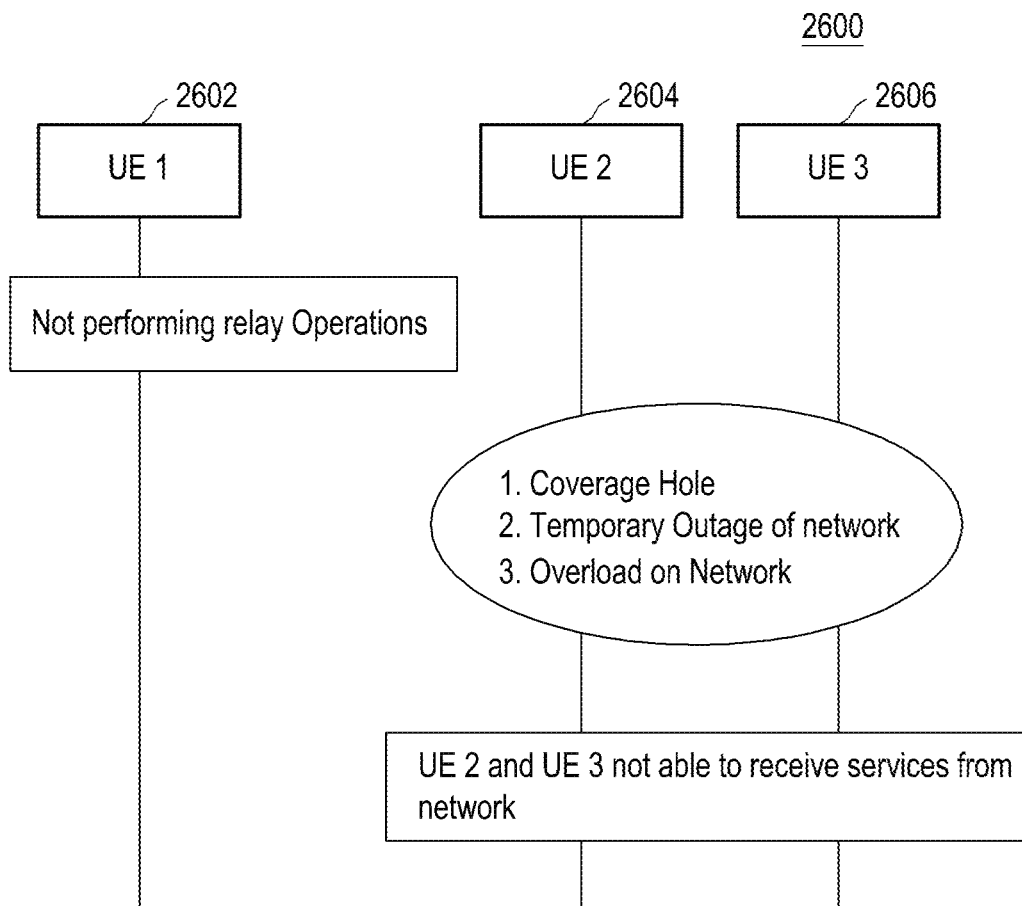
FIG. 26 is a schematic flow diagram illustrating an issue of network loss or a coverage hole, according to an existing art.

FIG. 25 is a schematic flow diagram 2500 illustrating a use case of announcing UE, according to an embodiment of the present invention. According to this embodiment, a UE 1 2502 (which is an announce mode and is not providing relay service) transmits a PC5 announce message to a UE 2 2504 (which is a monitor mode). The UE 1 2502 receives a direct communication request message from the UE 2 2504. The UE 1 2502 transmits a PC5 announce message to a UE 3 2506 (which is the monitor mode). The UE 1 2502 receives a direct communication request message from the UE 3 2506. Based on various parameters like a battery power level, a predefined time interval or announcement from other devices, the UE 1 2502 changes its mode from announce to monitor for a predefined interval and again changes its mode of operation from monitor to announce.

A prose UE (e.g. the UE 1 2502) identifies that there are no relay UE's which are announcing/no response from peer UEs (e.g. the UE 2 2504 and the UE 3 2506) which it is searching for to establish a direct communication. The prose UE can change its mode of operation from announce to monitor. The prose UE alternatively performs announcing and monitoring operations for pre-defined time periods periodically to ensure optimum power saving. The prose UE on identifying certain events (such as low battery, congestion in network) can change its mode of operation from announce monitor.

Figure 27:
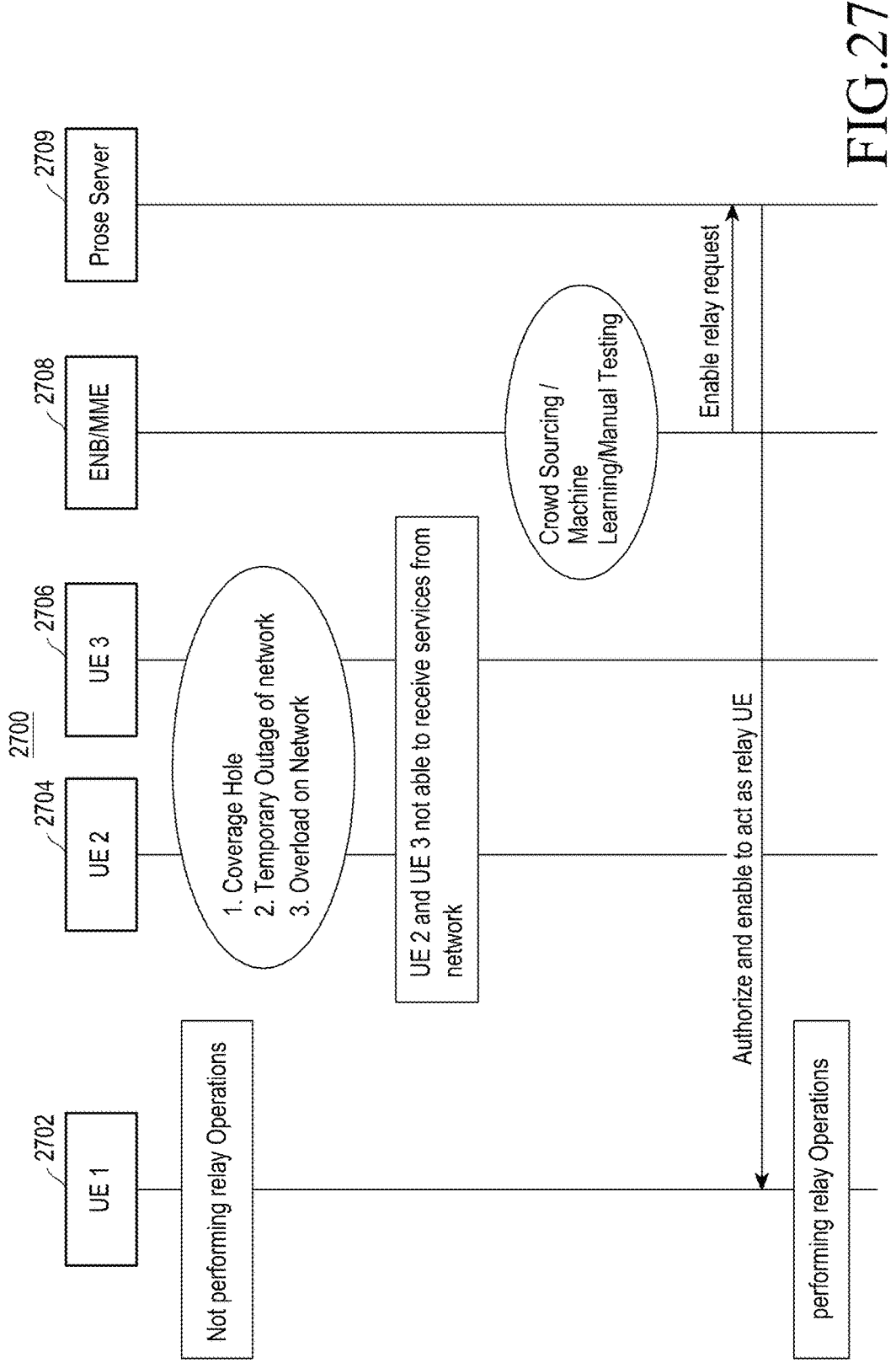
FIG. 27 is a schematic flow diagram illustrating a use case of enabling a UE to act as relay UE, according to an embodiment of the present invention.

FIG. 27 is a schematic flow diagram 2700 illustrating a use case of enabling a UE to act as relay UE, according to an embodiment of the present invention. According to this embodiment, a UE 1 2702 (which is a relay UE 1) is not performing relay operations. Between a UE 2 2704 and a UE 3 2706, there are a coverage hole, a temporary outage of a network or an overload on the network. The UE 2 2704 and the UE 3 2706 are not able to receive services from the network. An eNB (enode B)/MME (Mobility Management Entity) 2708 identify a coverage hole, a temporary outage of a network or an overload on the network via machine learning, crowd sourcing, manual testing etc. The eNB/ MME 2708 identifies UEs (e.g. the UE 1 2702, the UE 2 2704 and the UE 3 2706) which are relay capable but not performing relay currently that are present in the scenarios like above. The eNB/MME 2708 transmits an enable relay request message to a prose server 2709. The prose server 2709 dynamically authorize one or more ProSe relay capable UE(s), for example, UE 1 2702 to act as a UE-to-Network Relay. The UE 1 2702 performs relay operations.

Selection of which UEs to be authorized can be based on the current battery level of the relay capable UE, period for which that UE would be available in that location (based on machine learning), number of remote UEs that can be covered by the relay capable UE. Selection of which UEs to be authorized can be based decided either by the eNB/MME 2708 or by the prose server 2709. Location information will be shared from the eNB/MME 2708 to the prose server 2709 in Enable Relay request. (Optionally can include the list of UE's capable of relay operations in that particular location will be sent)

Figure 28:
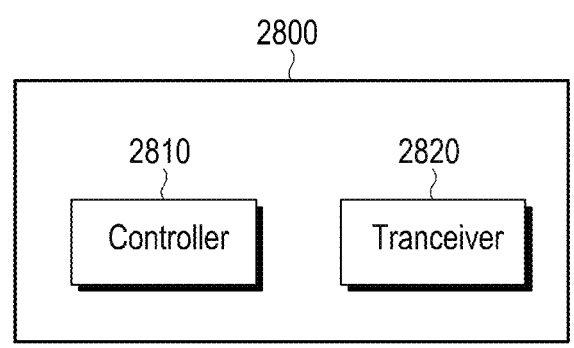
FIG. 28 is a view illustrating a configuration of an apparatus, according to an embodiment of the present invention.

FIG. 28 is a view illustrating a configuration of an apparatus, according to an embodiment of the present invention.

For ease of description, components not directly related to the present disclosure are neither shown nor described.

a. According to this embodiment, an apparatus 2800 for example, a UE or server may include a controller 2810 and a transceiver 2820. Although an example is described here that operations are performed with the controller 2810 and the transceiver 2820 separated from each other, all of the operations may also be performed in a single component as necessary. Or, the components may be divided into more components.

Although the present disclosure has been described with various embodiments, various changes and modifications may be suggested to one skilled in the art. It is intended that the present disclosure encompass such changes and modifications as fall within the scope of the appended claims.

What is claimed is:
1. A method of establishing a wireless local area network (WLAN) communication link, the method comprising:
 transmitting, by a first user equipment (UE), a proximity based services (ProSe) sidelink (PT5) discovery message including a neighbor awareness networking (NAN) service discovery information to a second UE over a PC5 link; and
 communicating, by the first UE, with the second UE over the WLAN communication link,
 wherein the WLAN communication link is established with the second UE based on the NAN service discovery information included in the PC5 discovery message, and
 wherein the NAN service discovery information includes at least one of a hashed NAN service identification, a hashed NAN interface address and a service specific information.
2. The method as claimed in claim 1, wherein the PC5 discovery message comprises parameters of at least one of:
 a message type;
 a ProSe application code;
 an MIC; and
 an UTC based counter.
3. The method as claimed in claim 1, further comprising:
 transmitting, by the first UE, a UE capability information to a server,
 wherein the UE capability information comprises at least one of a WLAN peer-to-peer (P2P) support or a WLAN NAN support and UEs preference for radio access technology to network during authorization.
4. The method as claimed in claim 2, wherein the message type indicates that the PC5 discovery message includes a WLAN discovery frame.
5. The method as claimed in claim 2, wherein the ProSe application code includes the NAN service discovery information.
6. The method as claimed in claim 1, further comprising:
 transmitting by the first UE, signal conditions related to the PC5 link and the WLAN communication link to a server;
 receiving by the first UE, from the server an authentication that the first UE automatically reselect to the PC5 link or the WLAN communication link to communicating with the second UE based on the signal conditions; and
 if the first UE is out of a WLAN coverage, communicating with the second UE over the PC5 link.
7. The method as claimed in claim 1, further comprising:
 transmitting by the first UE, a location of the first UE to a server; and
 receiving, by the first UE, from the server an instruction for communicating with the second UE over the PC5, if the first UE is out of a WLAN coverage.
8. A method of establishing a wireless local area network (WLAN) communication link, the method comprising:
 receiving, by a second user equipment (UE), a proximity based services (ProSe) sidelink (PC5) discovery message including a neighbor awareness networking (NAN) service discovery information from a first UE over a PC5 link;
 indicating, by the second UE, the PC5 discovery message to a WLAN stack of the second UE for decoding; and
 establishing, by the second UE, the WLAN communication link with the first UE based on the NAN service discovery information included in the PC5 discovery message; and
 communicating, by the second UE, with the first UE over the WLAN communication link,
 wherein the NAN service discovery information includes at least one of a hashed NAN service identification, a hashed NAN interface address and a service specific information.
9. A first user equipment (UE) for establishing a wireless local area network (WLAN) communication link, the first UE comprising:
 a transceiver configured to:
 transmit a proximity based services (ProSe) sidelink (PT5) discovery message including a neighbor awareness networking (NAN) service discovery information to a second UE over a PC5 link; and
 communicate with the second UE over the WLAN communication link,
 wherein the WLAN communication link is established by the second UE based on the NAN service discovery information included in the PC5 discovery message, and wherein the NAN service discovery information includes at least one of a hashed NAN service identification, a hashed NAN interface address and a service specific information.

10. The first UE as claimed in claim 9, wherein the PC5 discovery message comprises parameters of at least one of:
a message type;
a ProSe application code;
an MIC; and
an UTC based counter.

11. The first UE as claimed in claim 9, wherein the transceiver is configured to transmit a UE capability information to a server, and
wherein the UE capability information comprises at least one of a WLAN peer-to-peer (P2P) support or a WLAN NAN support and UEs preference for radio access technology to network during authorization.

12. The first UE as claimed in claim 10, wherein the message type indicates that the PC5 discovery message includes a WLAN discovery frame.

13. The first UE as claimed in claim 10, wherein the ProSe application code includes the NAN service discovery information.

14. The first UE as claimed in claim 9, wherein the transceiver is configured to transmit signal conditions related to the PC5 link and the WLAN communication link to a server,
receive from the server an authentication that the first UE automatically reselect to the PC5 link or the WLAN communication link to communicating with the second UE based on the signal conditions, and
if the first UE is out of a WLAN coverage, communicate with the second UE over the PC5 link.

15. The first UE as claimed in claim 9, wherein the transceiver is configured to transmit a location of the first UE to a server, and
receive from the server an instruction for communicating with the second UE over the PC5, if the first UE is out of a WLAN coverage.

16. A second user equipment (UE) for establishing a wireless local area network (WLAN) communication link, the second UE comprising:
a transceiver configured to:
receive a proximity based services (ProSe) sidelink (PC5) discovery message including a neighbor awareness networking (NAN) service discovery information from a first UE over a PC5 link; and
a controller is configured to:
indicate the PC5 discovery message to a WLAN stack,
establish a WLAN communication link with the first UE based on the NAN service discovery information included in the PC5 discovery message, and
communicate with the first UE over the WLAN communication link,
wherein the NAN service discovery information includes at least one of a hashed NAN service identification, a hashed NAN interface address and a service specific information.

* * * * *